US012169285B2

(12) United States Patent
Jones et al.

(10) Patent No.: US 12,169,285 B2
(45) Date of Patent: Dec. 17, 2024

(54) LOW-PROFILE COLOR-MIXING LIGHTPIPE

(71) Applicant: Fraen Corporation, Reading, MA (US)

(72) Inventors: Carlton S. Jones, Boxford, MA (US); Robert A. Gobron, Southborough, MA (US); Anthony L. Bolzan, Boxford, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 18/439,535

(22) Filed: Feb. 12, 2024

(65) Prior Publication Data

US 2024/0288704 A1 Aug. 29, 2024

Related U.S. Application Data

(63) Continuation-in-part of application No. 17/511,182, filed on Oct. 26, 2021, now Pat. No. 11,899,219, (Continued)

(51) Int. Cl.
*G02B 27/09* (2006.01)
*G02B 6/122* (2006.01)
*G02B 15/14* (2006.01)

(52) U.S. Cl.
CPC ......... *G02B 27/0994* (2013.01); *G02B 6/122* (2013.01); *G02B 15/142* (2019.08); *G02B 27/0955* (2013.01)

(58) Field of Classification Search
CPC ............ G02B 27/0994; G02B 27/0955; G02B 6/122; G02B 15/142
See application file for complete search history.

(56) References Cited

U.S. PATENT DOCUMENTS 2,540,839 A 2/1951 Southworth
3,752,561 A 8/1973 Klemt
(Continued)

FOREIGN PATENT DOCUMENTS

CN 1624578 A 6/2005
CN 1854884 A 11/2006
(Continued)

OTHER PUBLICATIONS

Anonymous: "TechSpec(™) Light Pipes Homogenize Non-Uniform Light Sources", Jul. 9, 2007 (Jul. 10, 2007), XP055263462, Retrieved from the Internet: URL:http://news.thomasnet.com/fullstory/light-pipes-homogenize-nonuniform-light-sources-523659,[retrieved on Apr. 6, 2016], 4 pages.
(Continued)

*Primary Examiner* — Anne M Hines
*Assistant Examiner* — Jose M Diaz
(74) *Attorney, Agent, or Firm* — Reza Mollaaghababa; Reza Sadr; Potomac Law Group, PLLC

(57) ABSTRACT

In one aspect, a light pipe is disclosed. In some embodiments, the light pipe comprises an input section including a waveguide having a circular cross section; and an output section having a polygonal cross section, wherein the input section has an input surface for receiving light from one or more light sources and an output surface through which light exits the input section, and the output section has an input surface optically coupled to the output surface of the input section to receive at least a portion of the light exiting the input section, and an output surface through which light exits the light pipe.

17 Claims, 35 Drawing Sheets

Related U.S. Application Data which is a continuation of application No. 16/717,500, filed on Dec. 17, 2019, now Pat. No. 11,156,847, which is a continuation of application No. 16/021,942, filed on Jun. 28, 2018, now Pat. No. 10,585,292.

(56) References Cited

U.S. PATENT DOCUMENTS

| | | | |
|---|---|---|---|
| 3,784,277 | A | 1/1974 | Baker |
| 5,271,077 | A | 12/1993 | Brockman et al. |
| 5,550,716 | A | 8/1996 | Dassanayake et al. |
| 6,056,426 | A | 5/2000 | Jenkins |
| 6,200,002 | B1 | 3/2001 | Marshall et al. |
| 6,219,480 | B1 | 4/2001 | Cassarly et al. |
| 6,341,876 | B1 | 1/2002 | Moss et al. |
| 6,547,416 | B2 | 4/2003 | Pashley et al. |
| 6,575,580 | B2 | 6/2003 | Okamori et al. |
| 6,614,972 | B1 | 9/2003 | Lundin |
| 6,819,505 | B1 | 11/2004 | Cassarly et al. |
| 6,995,355 | B2 | 2/2006 | Rains, Jr. et al. |
| 7,145,125 | B2 | 12/2006 | May et al. |
| 7,349,163 | B2 | 3/2008 | Angelini et al. |
| 7,581,862 | B2 | 9/2009 | Stefanov et al. |
| 7,907,345 | B2 | 3/2011 | Paulussen et al. |
| 8,184,372 | B1 | 5/2012 | Gu |
| 8,246,210 | B2 | 8/2012 | Angelini et al. |
| 8,482,226 | B2 | 7/2013 | Vinther et al. |
| 8,899,808 | B2 | 12/2014 | Speier et al. |
| 9,243,760 | B2 | 1/2016 | Niina et al. |
| 9,411,083 | B2 | 8/2016 | Angelini et al. |
| 9,772,499 | B2 | 9/2017 | Angelini et al. |
| 9,995,872 | B2 | 6/2018 | Angelini et al. |
| 10,151,872 | B2 | 12/2018 | Angelini et al. |
| 10,254,474 | B2 | 4/2019 | Angelini et al. |
| 10,585,292 | B2 | 3/2020 | Jones et al. |
| 11,156,847 | B2 | 10/2021 | Jones et al. |
| 2002/0135869 | A1 | 9/2002 | Banish et al. |
| 2003/0006230 | A1 | 1/2003 | Kaji et al. |
| 2004/0264185 | A1 | 12/2004 | Grotsch et al. |
| 2005/0036203 | A1 | 2/2005 | Ferri et al. |
| 2005/0168987 | A1 | 8/2005 | Tamaoki et al. |
| 2005/0286123 | A1 | 12/2005 | Abu-Ageel |
| 2006/0018031 | A1 | 1/2006 | Takasugi |
| 2006/0039160 | A1 | 2/2006 | Cassarly et al. |
| 2006/0044523 | A1 | 3/2006 | Teijido et al. |
| 2006/0153518 | A1 | 7/2006 | Abu-Ageel |
| 2006/0285308 | A1 | 12/2006 | Birman et al. |
| 2006/0291206 | A1 | 12/2006 | Angelini et al. |
| 2007/0024971 | A1 | 2/2007 | Cassarly et al. |
| 2007/0126994 | A1 | 6/2007 | Hwang |
| 2008/0030974 | A1 | 2/2008 | Abu-Ageel |
| 2008/0068852 | A1 | 3/2008 | Goihl |
| 2008/0080205 | A1 | 4/2008 | Forrester et al. |
| 2008/0239717 | A1 | 10/2008 | Chen et al. |
| 2008/0273338 | A1 | 11/2008 | Stefanov et al. |
| 2009/0034278 | A1 | 2/2009 | Tessnow et al. |
| 2009/0109698 | A1 | 4/2009 | Koyata et al. |
| 2009/0185392 | A1 | 7/2009 | Krupa et al. |
| 2010/0188018 | A1 | 7/2010 | Salm |
| 2010/0226127 | A1 | 9/2010 | Bigliatti et al. |
| 2011/0109445 | A1 | 5/2011 | Weaver et al. |
| 2011/0199780 | A1 | 8/2011 | Jak et al. |
| 2011/0267823 | A1 | 11/2011 | Angelini et al. |
| 2012/0127710 | A1 | 5/2012 | Jurik et al. |
| 2013/0039090 | A1 | 2/2013 | Dau et al. |
| 2013/0155723 | A1 | 6/2013 | Coleman et al. |
| 2013/0258699 | A1 | 10/2013 | Weaver |
| 2013/0294045 | A1 | 11/2013 | Morgenbrod et al. |
| 2013/0301291 | A1 | 11/2013 | Lavizzari |
| 2014/0286032 | A1 | 9/2014 | Fedosik et al. |
| 2014/0340927 | A1 | 11/2014 | Johnston et al. |
| 2016/0091653 | A1 | 3/2016 | Ban et al. |
| 2016/0370529 | A1 | 12/2016 | Angelini et al. |
| 2016/0370533 | A1 | 12/2016 | York et al. |
| 2017/0142314 | A1 | 5/2017 | Moore et al. |
| 2017/0245746 | A1 | 8/2017 | Komazaki et al. |
| 2017/0299955 | A1 | 10/2017 | Kawamura et al. |
| 2017/0307805 | A1 | 10/2017 | Wong et al. |
| 2017/0351101 | A1 | 12/2017 | Angelini et al. |
| 2018/0004356 | A1 | 1/2018 | Sugiyama et al. |
| 2018/0024441 | A1 | 1/2018 | Markle et al. |
| 2019/0033511 | A1 | 1/2019 | Gobron et al. |
| 2019/0146148 | A1 | 5/2019 | Angelini et al. |
| 2019/0278018 | A1 | 9/2019 | Angelini et al. |
| 2020/0004033 | A1 | 1/2020 | Jones et al. |

FOREIGN PATENT DOCUMENTS

| | | | | |
|---|---|---|---|---|
| CN | 1979251 | A | 6/2007 | |
| CN | 101725916 | A | 6/2010 | |
| CN | 201592676 | U | 9/2010 | |
| CN | 104541100 | A | 4/2015 | |
| CN | 109073821 | A * | 12/2018 | ......... G02B 19/0028 |
| CN | 217584282 | U | 10/2022 | |
| CZ | 2016601 | A3 | 11/2017 | |
| DE | 102013011864 | A1 | 2/2015 | |
| EP | 1398659 | A2 | 3/2004 | |
| EP | 2211089 | A1 | 7/2010 | |
| EP | 2211090 | A1 | 7/2010 | |
| EP | 2669721 | A1 | 12/2013 | |
| EP | 3588169 | A1 | 1/2020 | |
| JP | 2004184612 | A | 7/2004 | |
| JP | 2004311162 | A | 11/2004 | |
| JP | 3688708 | B2 | 8/2005 | |
| JP | 2007012530 | A | 1/2007 | |
| JP | 2007033831 | A | 2/2007 | |
| JP | 2009252695 | A | 10/2009 | |
| JP | 2014107240 | A | 6/2014 | |
| JP | 2019509514 | A | 4/2019 | |
| TW | 201022575 | A | 6/2010 | |
| WO | 2004032250 | A1 | 4/2004 | |
| WO | 2010091097 | A1 | 8/2010 | |
| WO | 2010113100 | A1 | 10/2010 | |
| WO | 2012036541 | A1 | 3/2012 | |
| WO | 2012122511 | A1 | 9/2012 | |
| WO | 2013098387 | A2 | 7/2013 | |
| WO | 2013149139 | A1 | 10/2013 | |
| WO | 2017078771 | A1 | 5/2017 | |

OTHER PUBLICATIONS

Application Brief 1-003. Light Guide Technologies; Using LED Lamps. Avago Technologies. Dec. 11, 2006: 22 pages.

European Examination Report dated Apr. 8, 2019 from EP Application No. 167502772, 4 pages.

European Examination Report in corresponding European Application, EP12816673.3 dated Apr. 15, 2016, 7 pages.

European Examination Report, EP19182884.7, dated Feb. 17, 2023, 7 pages.

European Extended Search Report, EP19182884.7, dated Nov. 22, 2019, 10 pages.

European Search Report and Search Opinion dated Feb. 14, 2018 from corresponding European Application No. EP17198505.4, 5 pages.

European Search Report and Search Opinion dated Feb. 19, 2018 from corresponding European Application No. EP17198516.1, 9 pages.

European Search Report and Search Opinion dated Sep. 18, 2019 from corresponding European Application No. EP19192567.6, 10 pages.

Extended European Search Report and European Search Opinion dated May 3, 2019 from corresponding EP Application No. 19157504.2, 8 pages.

Extended European Search Report and European Search Opinion dated Nov. 22, 2018 from corresponding EP Application No. 18194921.5, 9 pages.

Extended European Search Report and European Search Opinion dated Nov. 22, 2019 from corresponding EP Application No. 19182884.7, 10 pages.

International Preliminary Report on Patentability from PCT/US2016/038070 dated Dec. 19, 2017; 12 pages.

(56) References Cited

OTHER PUBLICATIONS

International Search Report and Written Opnion for from PCT Application PCT/EP2012/077043 dated Aug. 9, 2013 25 pages.
International Search Report and Written Opnion from PCT/US2016/038070 dated Nov. 16, 2016; 17 pages.
International Search Report/Written Opinion for PCT/US2018/042058 dated Dec. 10, 2018, 12 pages.
Invitation to Pay Additional Fees for PCT Application No. PCT/US2016/038070, dated Sep. 20, 2016; 7 pages.
Japanese Office Action for corresponding Japanese Application No. 2014-549484 dated Oct. 13, 2015, pp. 3.
Japanese Office with English Translation for corresponding Japanese Application 2014-549484 dated May 12, 2015, 5 pages.
Office Action received in Chinese Application No. 201280064730.7, dated Dec. 2, 2016; 16 pages.
PCT International Preliminary Report on Patentability and Written Opinion for PCT/EP2012/077043 dated Jul. 1, 2014 18 pages.
Renaissance Lighting Introduces evo(™) Solid State Product Line With Ed Series, Industry's First LED Downlight, https://www.ledsmagazine.com/company-newsfeed/article/16690010/renaissance-unveils-evo-solidstate-product-line, (May 9, 2006).
Third Party Observation submitted in corresponding European Application, EP12816673.3, dated Jan. 27, 2016, 5 pages.
Third Party Observation submitted in corresponding European Application, EP12816673.3, dated Oct. 27, 2017, 6 pages.
U.S. Appl. No. 13/729,459, filed Dec. 28, 2012, Marco Angelini et al.
U.S. Appl. No. 15/185,627, filed Jun. 17, 2016, Marco Angelini et al.
U.S. Appl. No. 15/200,843, filed Jul. 1, 2016, Marco Angelini et al.
U.S. Appl. No. 15/976,314, filed May 10, 2018, Marco Angelini et al.
U.S. Appl. No. 16/035,339, filed Jul. 13, 2018, Robert A. Gobron.
U.S. Appl. No. 16/156,620, filed Oct. 10, 2018, Marco Angelini et al.
U.S. Appl. No. 16/246,127, filed Jan. 11, 2019, Marco Angelini et al.
U.S. Appl. No. 16/425,158, filed May 29, 2019, Marco Angelini et al.
International Search Report and Written Opinion for International Patent Application No. PCT/US2024/012745 mailed May 3, 2024.

\* cited by examiner

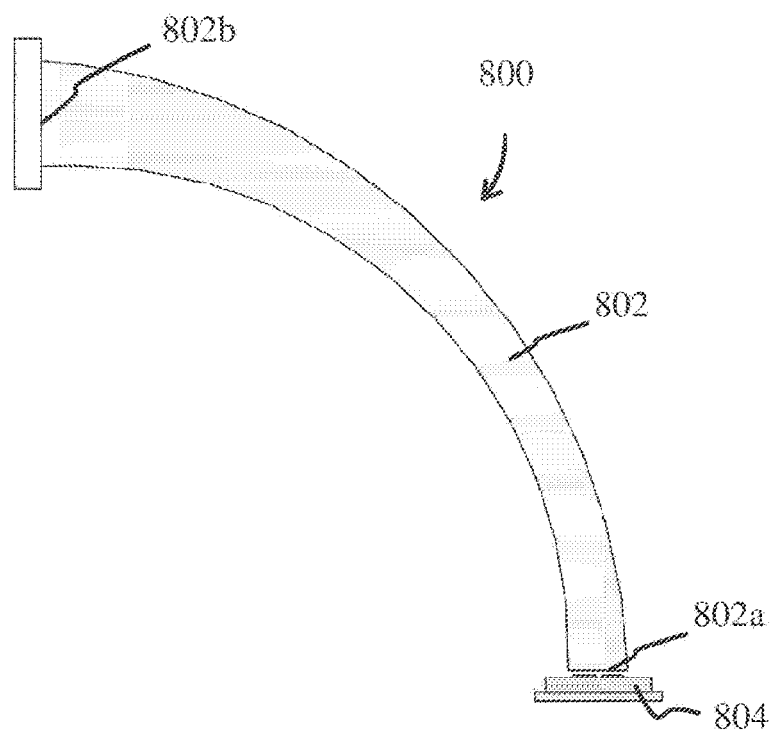
FIG. 8A
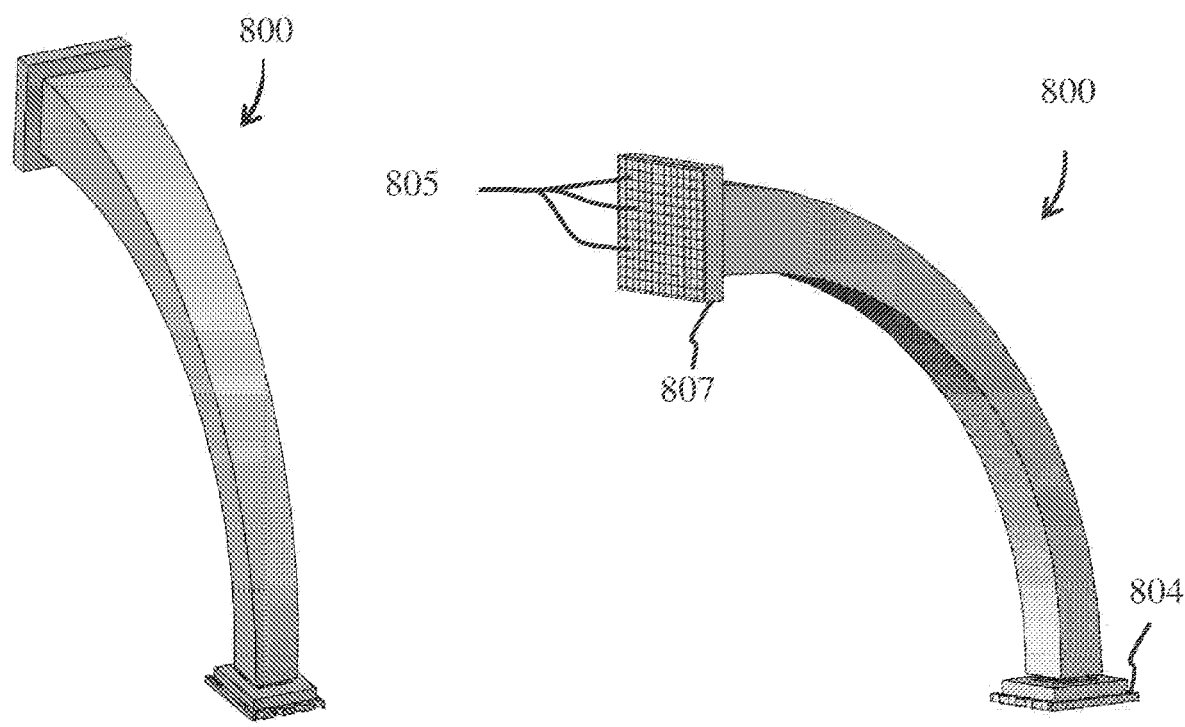
FIG. 8B
FIG. 8C

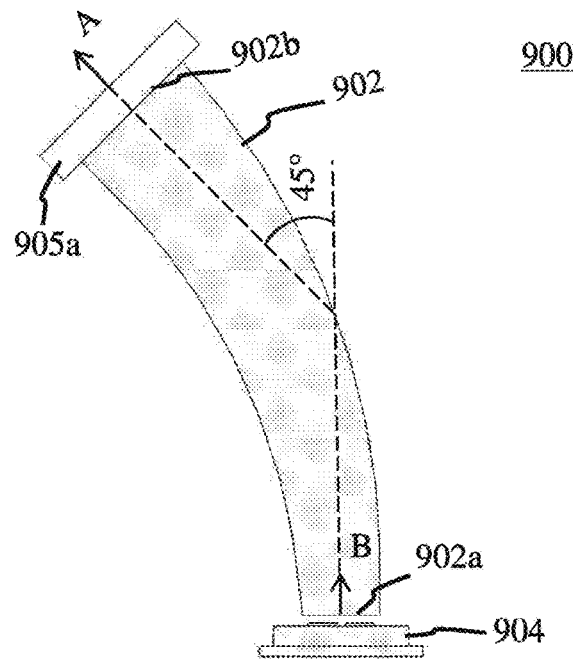
FIG. 9A
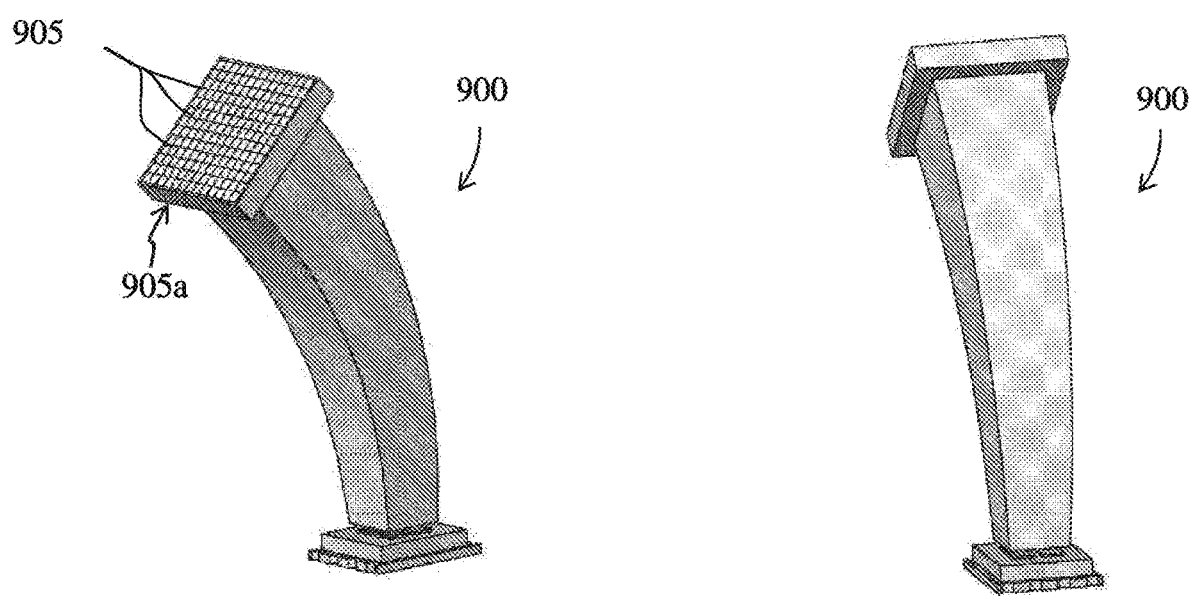
FIG. 9B
FIG. 9C

LOW-PROFILE COLOR-MIXING LIGHTPIPE

CROSS-REFERENCE TO RELATED APPLICATION

The present application is a continuation of U.S. patent application Ser. No. 17/511,182, now issued as U.S. Pat. No. 11,899,219, filed on Oct. 26, 2021, which claims priority to and is a continuation of U.S. patent application Ser. No. 16/717,500, now issued as U.S. Pat. No. 11,156,847, filed on Dec. 17, 2019, which claims priority to and is a continuation of U.S. patent application Ser. No. 16/021,942, now issued as U.S. Pat. No. 10,585,292, filed on Jun. 28, 2018, the teachings of which are incorporated herein by reference in their entirety.

BACKGROUND

A variety of light-mixing optical systems are available for mixing light from one or more light sources, e.g., solid-state light emitting diodes (LEDs). Some conventional light-mixing systems include one-piece collimators as well as two-piece systems, which can consist of a color-mixing rod and a secondary lens that is capable of generating variable beam angles. As the length of the rod increases, so does the effectiveness of the light mixing (color mixing) provided by the rod. However, in conventional systems, an increase in the length of the mixing rod results in a concomitant increase in the height of the system. Many applications, however, require not only excellent light mixing but also a shorter system height than that provided by conventional systems. Accordingly, there is a need for improved light-mixing systems.

SUMMARY

In one aspect, a light-mixing system is disclosed, which includes a light pipe having an input surface configured for receiving light from a light source, a light-mixing segment optically coupled to the input surface, and an output surface optically coupled to the light-mixing segment through which light exits the light pipe. A putative vector normal to at least one of the input or the output surface forms a non-zero angle relative to a longitudinal axis of the light-mixing segment. In some embodiments, the non-zero angle can be, for example, about 90 degrees.

In some embodiments, the light-mixing system can further include a reflective surface that is optically coupled to the input surface and the light-mixing segment of the light pipe for directing at least a portion of the light received via the input surface to the light-mixing segment. In some embodiments, the reflective surface is metalized to cause the reflection of the light incident thereon. In other embodiments, the reflective surface can reflect the light incident thereon via total internal reflection.

In some embodiments, the light-mixing segment has a polygonal cross-sectional profile. By way of example, the light-mixing segment can have a square, a rectangular, a hexagonal, or an octagonal profile.

In some embodiments, the output surface of the light pipe can include a plurality of microlenses, surface texturing or both. By way of example, the surface texturing can be characterized by a plurality of surface projections having a height in a range of about 0.01 mm to about 1 mm. The microlenses can have spherical or aspherical shapes.

In some of the above embodiments, a ratio of a vertical separation (D) between the input and output surfaces of the light pipe relative to a lateral separation (L) therebetween can be, for example, in a range 0 to about 1.

In a related aspect, a light-mixing system is disclosed, which includes a light pipe comprising an input surface for receiving light from a light source, a light-mixing segment optically coupled to the input surface, and an output surface that is optically coupled to the light-mixing segment and through which light can exit the light pipe. At least one of the input and output surfaces is positioned relative to the light-mixing segment such that a resultant propagation direction of light entering the light pipe via the input surface or exiting the light pipe via the output surface forms a non-zero angle relative to a resultant propagation direction of light passing through at least a portion of the light-mixing segment.

In another aspect, a light-pipe is disclosed, which includes a curved light-guiding waveguide extending from a proximal end to a distal end. The curved light-guiding waveguide can include an input surface at the proximal end configured to receive light from a light source and an output surface at the distal end through which light exits the waveguide. In some such embodiments, a projection lens can be optically coupled to the output surface of the light pipe. Further, in some embodiments, the light source can be positioned relative to the input surface of the light pipe such that the light entering the input surface propagates along a direction opposite to the direction of the light exiting the output surface.

In some embodiments of the above light-pipe, a putative vector normal to the input surface of the light pipe is substantially parallel to a putative vector normal to its output surface.

In some embodiments, the curved light-guiding waveguide has a serpentine shape. In some embodiments, the curved light-guiding waveguide has a hemispherical shape.

In some embodiments, the output surface of the light pipe can include a plurality of microlenses and/or surface texturing, such as those discussed herein, for diffusing and/or redirecting the light passing through the output surface.

In some embodiments, a light mixing system according to the present teachings can include a heat sink that is thermally coupled to a light source of the light mixing system for removing heat therefrom. By way of example, the heat sink can include a plurality of fins for facilitating the removal of heat from the light source.

In some embodiments, a light mixing system according to the present teachings can include a light pipe that extends from an input surface to an output surface, where the input and output surfaces are oriented at a 90-degree angle relative to one another. In some such embodiments, the output surface can include a plurality of microlenses and/or surface texturing.

In some embodiments, a light mixing system according to the present teachings can include a light pipe that extends from an input surface to an output surface, where the input and the output surfaces are oriented at 45 degrees relative to one another. In some such embodiments, the output surface can include a plurality of microlenses and/or surface texturing.

In some embodiments, a light pipe of a light-mixing system according to the present teachings can exhibit a tapered cross section extending from its input surface to its output surface, e.g., the tapered cross section can result in an increase in the cross-sectional area of the light pipe as the light pipe extends from its input surface to its output surface.

In some embodiments, a light pipe of a light-mixing system according to the present teachings can have a light pipe exhibiting different cross-sectional shapes along its length. For example, the cross sections of different sections of the light pipe can have different polygonal shapes. Alternatively, in some embodiments, a portion of the light pipe, e.g., a portion proximate to the input surface, can have a polygonal shape and another portion of the light pipe, e.g., a portion proximate to the output surface, can have a round shape.

In the above embodiments, the light pipe and/or the projection lens can be made of a variety of suitable materials, such as polymeric materials. Some examples of suitable materials include, without limitation, PMMA (polymethyl methacrylate), silicone, and glass.

Some embodiments relate to a light-mixing system including: a light pipe including: an input surface configured for receiving light from a light source; a light-mixing segment optically coupled to the input surface; and an output surface optically coupled to the light-mixing segment, and configured such that at least a portion of the light received at the input surface exits the light pipe through the output surface, wherein: the light-mixing segment includes a first section and a second section, the second section is optically coupled to the first section, the first section has a circular cross section, and the second section has a polygonal cross section.

Some embodiments relate to a light-mixing system, wherein the second section is configured to receive light from the input surface and the first section is configured such that the output surface receives light from the first section.

Some embodiments relate to a light-mixing system, wherein the first section is configured to receive light from the input surface and the second section is configured such that the output surface receives light from the second section.

Some embodiments relate to a light-mixing system, wherein the second section has a straight profile.

Some embodiments relate to a light-mixing system, wherein the second section is flared.

Some embodiments relate to a light-mixing system, wherein the first section has a curved profile.

Some embodiments relate to a light-mixing system, wherein the second section is flared.

Some embodiments relate to a light-mixing system, wherein one of the first section and the second section has a curved profile.

Some embodiments relate to a light-mixing system, wherein another one of the first section and the second section has a straight profile.

Some embodiments relate to a light-mixing system, wherein one of the first section and the second section has a straight profile.

Some embodiments relate to a light-mixing system, wherein the second section is flared.

Some embodiments relate to a light pipe, including: an input section including a waveguide having a circular cross section; and an output section having a polygonal cross section, wherein: the input section has an input surface for receiving light from one or more light sources and an output surface through which light exits the input section, and the output section has an input surface optically coupled to the output surface of the input section to receive at least a portion of the light exiting the input section, and an output surface through which light exits the light pipe.

Some embodiments relate to a light pipe, wherein the waveguide of the input section is curved.

Some embodiments relate to a light pipe, wherein the output section is straight.

Some embodiments relate to a light pipe, wherein the output section is flared.

Some embodiments relate to a light pipe, wherein the output section is straight.

Some embodiments relate to a light pipe, wherein the output section is flared.

Further understanding of various aspects of the embodiments can be obtained by reference to the following detailed description in conjunction with the associated drawings, which are described briefly below.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings:

FIG. 9A is a schematic cross-sectional view of a light system according to an embodiment in which the input and output surfaces of a light pipe of the light system are oriented at a 45-degree angle relative to one another, FIG. 9B is a schematic perspective view of the light system illustrated in FIG. 9A, depicting a plurality of microlenses optically coupled to the output surface of the light pipe of the light system, FIG. 9C is another schematic perspective view of the light system shown in FIG. 9A.

DETAILED DESCRIPTION

Figure 1A:
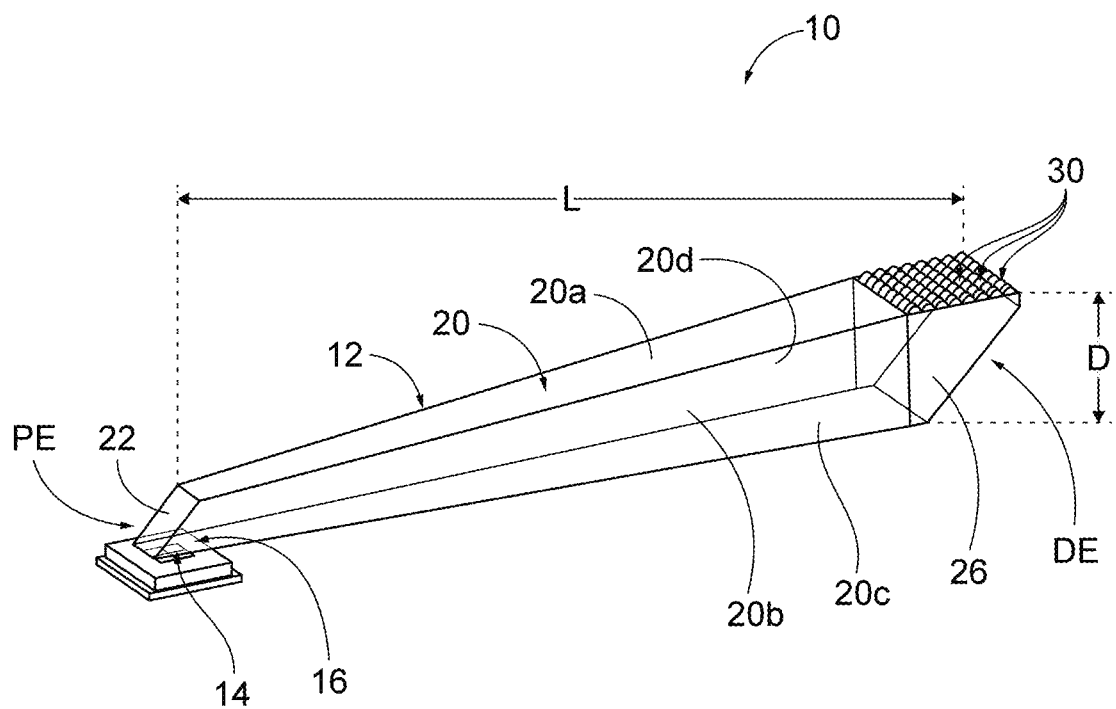
FIG. 1A schematically depicts a light-mixing system according to an embodiment.

The following detailed description refers to the accompanying drawings. The same or similar reference numbers may have been used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

The present disclosure is generally directed to light-mixing systems that employ a light pipe for mixing light received from one or more light sources. As discussed in more detail below, the light-mixing systems according to the present teachings can provide efficient light mixing while having a height that is significantly shorter than that of conventional light-mixing systems providing comparable light-mixing efficiency.

Various terms are used herein consistent with their ordinary meanings in the art. By way of clarification, certain terms are further described below.

An input surface is laterally separated from an output surface when two putative lines, each of which is normal to the center of one of those surfaces, are not co-extensive (i.e., they are not superimposed on one another).

The "lateral separation" or "lateral distance" between an input surface and an output surface of a light pipe refers to the shortest distance between two putative vectors normal to the centers of those surfaces along a direction normal to at least one of those vectors.

The "vertical separation" or "vertical distance" between an input surface and an output surface refers to the shortest distance between those surfaces along a direction parallel to a putative vector normal to at least one of those surfaces.

Moreover, in various embodiments, two surfaces may be considered to be optically coupled if at least a portion of the light that exits one of the two surfaces enters the other of the two surfaces. Similarly, two sections may be considered to be optically coupled if at least one of the exterior surfaces of one of the two sections is optically coupled to at least one of the exterior surfaces of the other one of the two sections.

FIGS. 1A, 1B, 1C and 1D schematically depict an optical system 10 according to an embodiment of the present teachings, which includes a light pipe 12 that is optically coupled to a light source 14. In this embodiment, the light source 14 is a multi-color light emitting device (LED), such as an RGBW LED. In other embodiments, other light sources, including single-color LEDs can also be employed.

The light pipe 12 includes an input surface 16 that is positioned in proximity of the light source 14 so as to receive at least a portion of the light emitted by the light source 14. In some embodiments, the input surface 16 is configured and positioned relative to the light source 14 such that it receives at least about 70 percent, or at least about 80 percent, or at least about 90 percent, and preferably 100 percent, of the light energy generated by the light source.

The light pipe 12 further includes a light-guiding (herein also referred to as light-mixing) segment 20 that extends from a proximal end (PE) to a distal end (DE) and is optically coupled to the input surface 16 to receive at least a portion of the light entering the light pipe via the input surface. More specifically, in this embodiment, the light pipe 12 includes a reflective surface 22 that is positioned at a 45-degree angle relative to the input surface 16 for directing the light received via the input surface 16 into the light-mixing segment 20. In this embodiment, the reflective surface 22 is metalized. For example, a layer of a suitable metal 22a, such as gold or silver, can be deposited on the surface 22 so as to reflect the light incident thereon. In some embodiments, the thickness of such a metal layer can be, for example, in a range of about a few angstroms to about a few microns. In other embodiments, the reflective surface 22 can be configured so as to reflect the light incident thereon via total internal reflection.

Figure 1B:
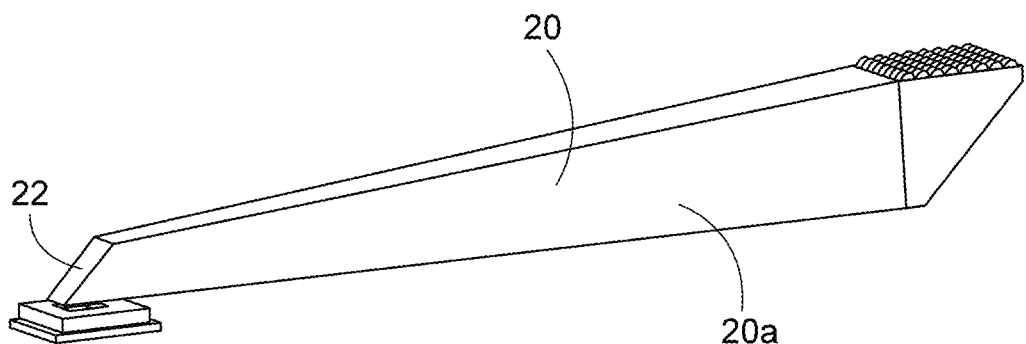
FIG. 1B is a schematic perspective view of the light pipe employed in the light-mixing system of FIG. 1A, FIG. 1C schematically depicts an output surface of an implementation of the light pipe of the system shown in FIGS. 1A and 1B, where the output surface includes a plurality of microlenses, FIG. 1D schematically depicts an output surface of an implementation of the light pipe of the system shown in FIGS. 1A and 1B, where the output surface includes surface texturing, FIG. 1E schematically depicts an output surface of an implementation of the light pipe of the system shown in FIGS. 1A and 1B, where the output surface includes both microlenses and surface texturing, FIG. 1F schematically depicts an output surface of a light pipe of a light-mixing system according to an embodiment, where the output surface comprises a plurality of microlenses FIG. 1G schematically depicts an output surface of a light pipe of a light-mixing system according to an embodiment, where the output surface comprises a plurality of microlenses having textured surfaces, FIG. 1H schematically depicts an output surface of a light pipe of a light-mixing system according to an embodiment, where the output surface comprises surface texturing, FIG. 1J schematically depicts an implementation of the light-mixing system of FIG. IA in which a projection lens is optically coupled to an output surface of the system's light pipe, FIG. 1K schematically depicts a zoom lens employed as a projection lens in an embodiment of a light-mixing system according to the present teachings, where the zoom lens comprises two lens (the zoom lens is depicted in a narrow-beam configuration in this figure), FIG. 1L schematically depicts the zoom lens of FIG. 1K in a wide-beam configuration, FIG. 1M schematically depicts an implementation of the light-mixing system of FIG. IA in which a single-lens zoom lens is employed in a narrow beam configuration, FIG. 1N schematically depicts the zoom lens of FIG. 1M in a wide-beam configuration, FIG. 2 schematically depicts an array of light-mixing systems according to the present teachings, FIGS. 3A and 3B schematically depict a light-mixing system according to another embodiment.
Figure 1C:
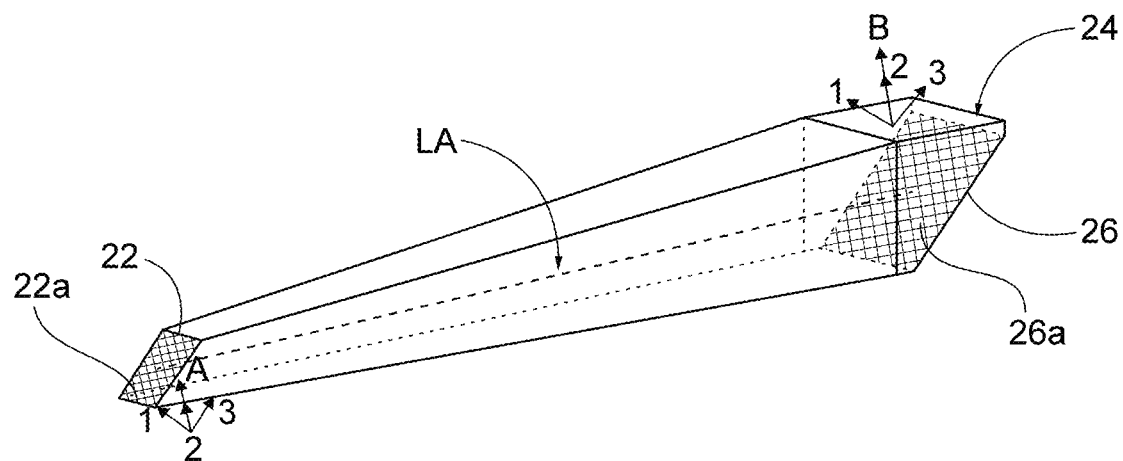
Figure 1D:
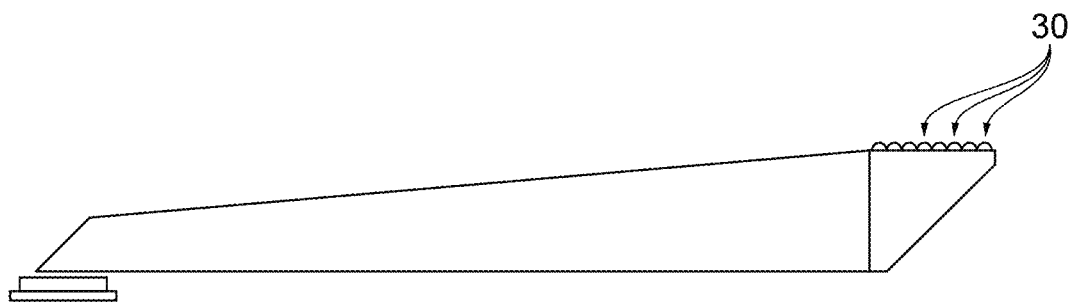

As shown schematically in FIG. 1C, in this embodiment, the input surface 16 is positioned relative to the light-mixing segment 20 such that a putative vector (A) normal to the input surface is substantially orthogonal to a longitudinal axis (LA) of the light-mixing segment 20.

In many embodiments, the light-mixing segment 20 has a polygonal cross-sectional shape, though cylindrical light-mixing segments can also be employed in some embodiments. In this embodiment, the light-mixing segment 20 includes four peripheral surface portions 20a, 20b, 20c, and 20d (herein collectively referred to as peripheral surface portions 21) that impart a square cross-sectional shape to the light-mixing segment 20. In this embodiment, these peripheral surface portions are configured to reflect light incident thereon via total internal reflection. In other embodiments, one or more of these surface portions can be metalized for reflecting light incident thereon. In this embodiment, the input surface 16 is contiguous with the peripheral surface portion 20b.

The light entering the light-mixing segment can undergo multiple reflections at surface portions 21 and advance along the light-mixing segment from the input surface 16 to reach a reflective surface 26 disposed at the distal end of the light-mixing segment 20, which reflects the light incident thereon onto an output surface 24. In this embodiment, the distal reflective surface 26 can be metalized. For example, the reflective surface 26 can be coated with a metal layer 26a having a thickness, for example, in a range of about a few angstroms to about a few microns. Similar to the input surface, the output surface 24 is also positioned relative to the light-mixing segment 20 such that a putative vector (B) normal to the output surface forms a non-zero angle relative to the longitudinal axis (LA) of the light-mixing segment 20. In this embodiment, this non-zero angle is about 90 degrees. Further, in this embodiment, the output surface 24 is contiguous with the peripheral surface portion 20c.

Further, in this embodiment, a plurality of microlenses 30 are optically coupled to the output surface so as to diffuse and/or redirect the light exiting the optical system via the output surface 24. In this embodiment, the output surface 24 incorporates the microlenses 30. In other embodiments, the microlenses 30 can be formed in a separate substrate (not shown), e.g., a plastic substrate, which can be coupled to the output surface 24.

Figure 1J:
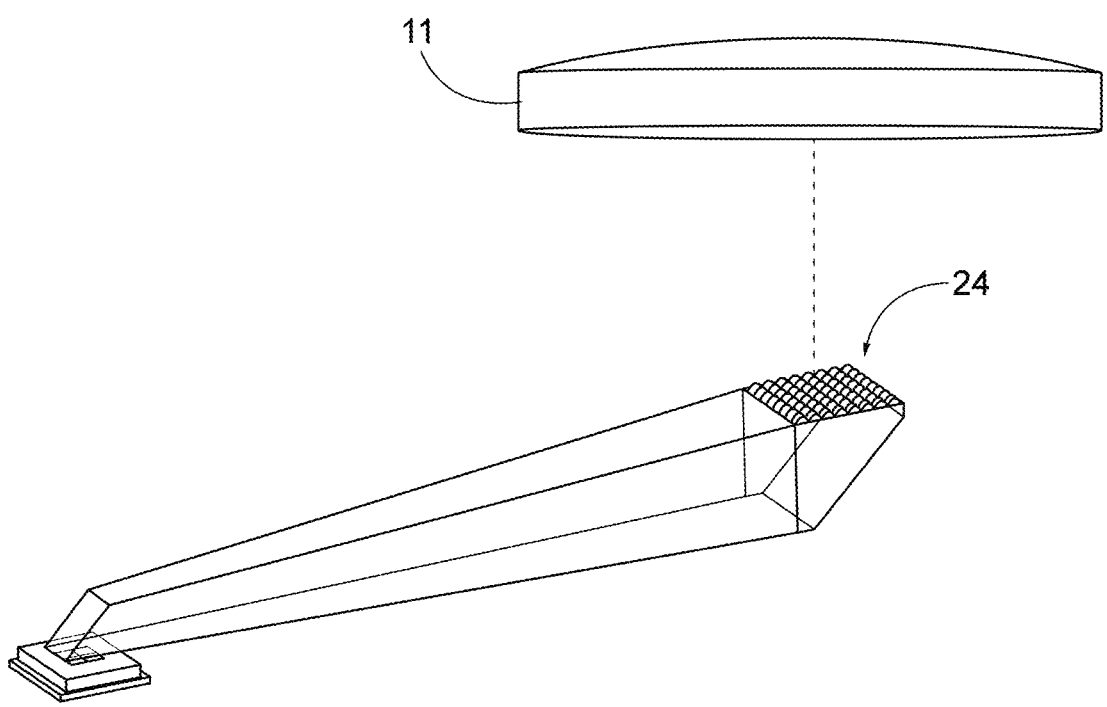
Figure 1E:
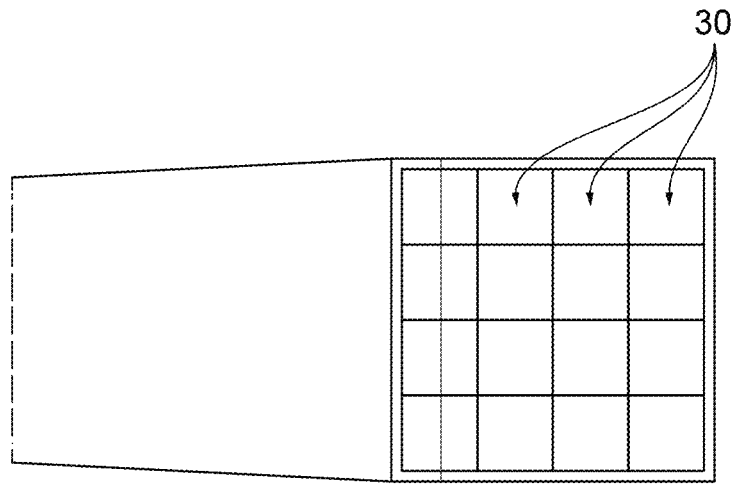
Figure 1F:
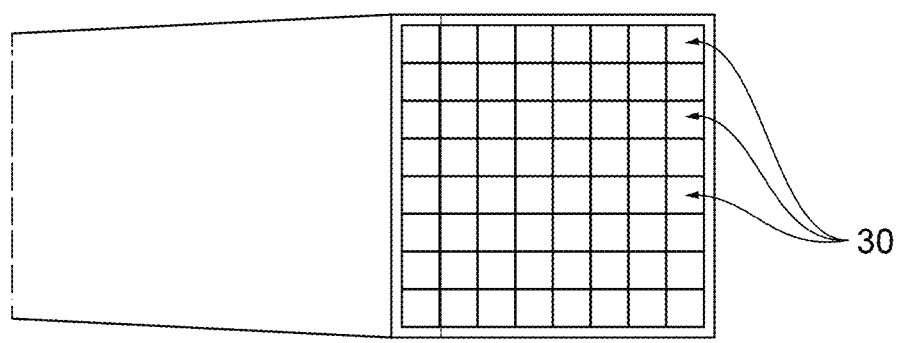

As shown schematically in FIGS. 1E and 1F, the microlenses 30 can have a variety of different sizes. By way of example, in some embodiments, the microlenses can have hemispherical shapes (See, e.g., FIG. 1D) with a diameter in a range of about 0.05 mm to about 1 mm. Further, in some embodiments, the pitch of the microlenses, i.e., the center-to-center spacing of the microlenses, can be, for example, in a range of about 0.1 mm to about 1 mm, e.g., in a range of about 0.1 mm to about 0.5 mm. In some embodiments, the microlenses can have an aspheric shape.

Figure 1G:
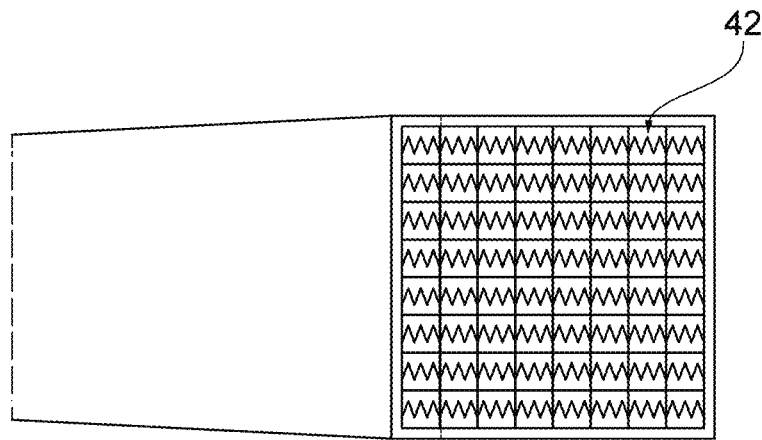

As shown schematically in FIG. 1G, in some embodiments, the surfaces of the microlenses 30 can be textured. For example, the surfaces of the microlenses 30 can include a plurality of projections 42 having a height, for example, in a range of about 0.01 mm to about 1 mm.

Figure 1H:
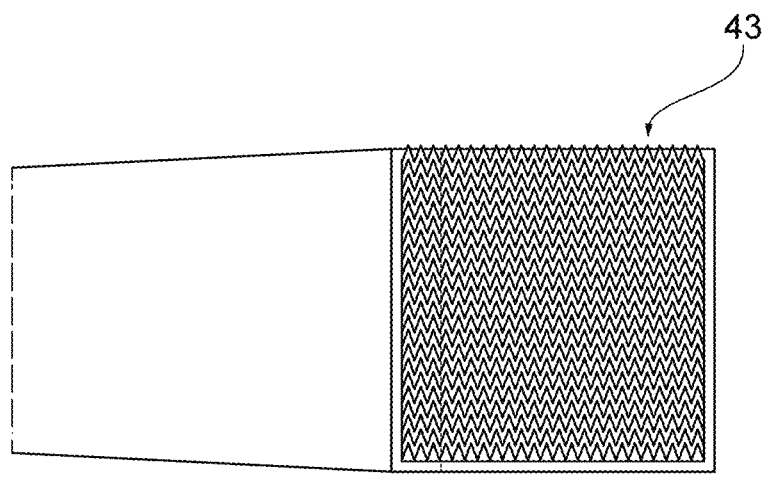

Further, as shown schematically in FIG. 1H, in some embodiments, the output surface can include texturing, e.g., a plurality of projections 43 having a height in a range of about mm to about 1 mm, without microlenses.

Referring again to FIG. 1A, in this embodiment, a lateral separation (L) between the input and output surfaces can be, for example, in a range of about 20 mm to about 200 mm and a vertical separation (D) between those surfaces can be, for example, in a range of about Oto about 20 mm. Further, the ratio of D/L can be in a range of about Oto about 1, e.g., in a range of about 0.1 to about 0.5.

As shown in FIG. 1J, in some embodiments, a projection lens 11 can be optically coupled to the output surface 24 for projecting the light exiting the output surface 24 onto a target surface. In some embodiments, the lens 11 is in the form of a zoom lens assembly. In other embodiments, the optical system may not include a projection lens.

Figure 1K:
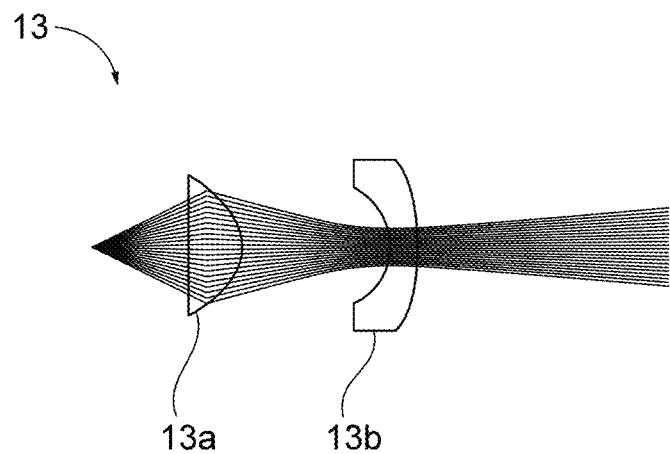
Figure 1L:
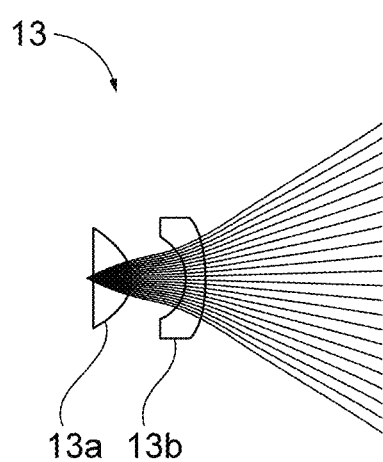
Figure 1M:
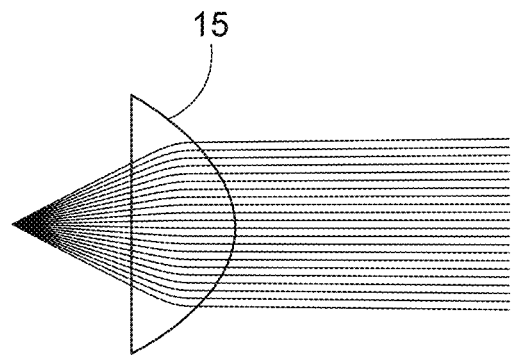
Figure 1N:
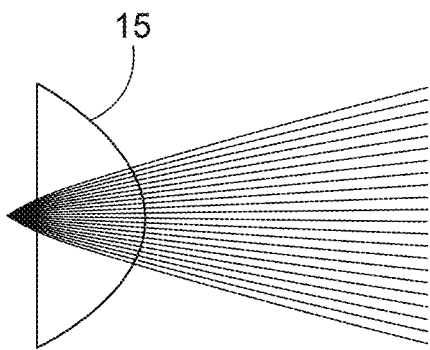

By way of example, FIGS. 1K and 1L schematically depict a zoom lens system 13 (herein also referred to as a doublet zoom) that includes a lens 13a providing a positive optical power and a lens 13b providing a negative optical power. At least one of the lenses, and in some cases both, is axially movable relative to the output surface of the light pipe to change the angular spread of the output beam between a narrow-beam spread (shown in FIG. 1K) and a wide-beam spread (shown in FIG. 1L). For example, the angular spread of the output beam can be varied between about 5 degrees to about 80 degrees. The use of a doublet lens system with one positive lens and one negative lens can be advantageous in applications where a wide beam range, e.g., divergence (FWHM) in a range of about 20 to about 80 degrees, is required. In embodiments in which the zoom lens includes a single positive lens (herein also referred to as a singlet zoom), in the "infrafocal position" (i.e., when the lens is placed close to the output surface of the light pipe), the positive power of the lens can reduce the divergence of the beam exiting through the output surface of the light pipe (See, FIGS. 1M and 1N for schematic representation of a narrow-beam and wide-beam spread of the output beam in a system in which a singlet zoom 15 is employed). In contrast, the positive and negative optical powers of the lenses of a doublet zoom allow achieving much wider beam spread, e.g., in a range of about 20 degrees to about 80 degrees (FWHM), when the zoom system is in the "intrafocal position." Further, in many embodiments, a multiple-lens zoom lens can provide other advantages, such as conventional advantages known in the art.

In some embodiments, the projection lens 11 can be a stationary lens that receives light emitted by the output surface of the light pipe and projects that light onto a target surface.

In some implementations, the light system 10 can transfer light from its input surface to its output surface with an efficiency in a range of about 30% to about 50%.

The light system 10 can provide a number of advantages. For example, it can provide excellent light mixing while having a significantly shorter height. In other words, while the length L of the light pipe can be sufficiently long so as to cause a desired degree of light mixing, the separation D between the input and output surfaces can be made much shorter than that in conventional systems.

With reference to FIG. 1B, in use, the light rays emitted by the light source 14, such as the exemplary light rays 1, 2, 3 are incident on the input surface 16 and enter the light pipe via the input surface. The reflective surface 22 redirects these light rays into the light-mixing segment 20. The rays undergo multiple reflections at the surface portions 21 to reach the reflective surface 26 at the distal end of the light-mixing segment. The rays are then reflected at this reflective surface 26 to reach the output surface 24. In this embodiment, the resultant propagation direction of the light rays incident on the input surface, as characterized, e.g., by the direction of the sum of the vectors associated with the incident light rays (i.e., the direction of the central ray 2 in this embodiment) is orthogonal to the resultant propagation direction of the light rays through the light-mixing segment 20 (in this case along the longitudinal axis (LA) of the light-mixing segment). Similarly, the resultant propagation direction of the light rays exiting the light pipe via the output surface 24 (i.e., rays 1', 2' and 3') is orthogonal to the resultant propagation direction of the light rays traversing the light-mixing segment 20. In other embodiments, the input and output surfaces can be configured such that the resultant propagation directions of the light rays entering or exiting the light pipe can make non-zero angles other than 90 degrees relative to the longitudinal direction of the light-mixing segment 20.

Figure 2:
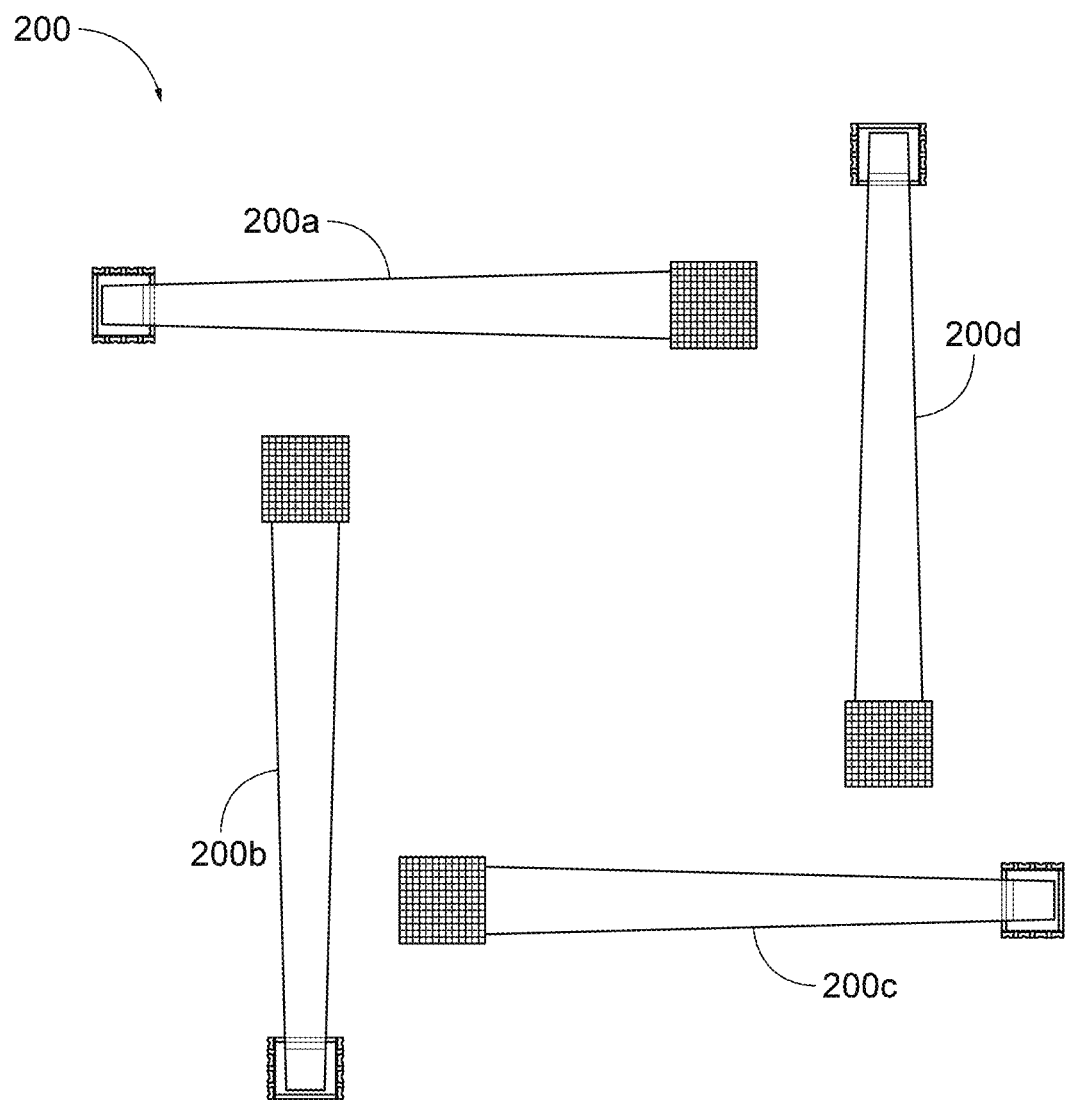

FIG. 2 schematically depicts a light array 200 that is formed by using four of the light-mixing systems 10 discussed above. More specifically, the light array 200 includes light-mixing systems 200a, 200b, 200c, and 200d, where the light pipes of the light mixing system 200a is substantially parallel to the light pipe of the light-mixing system 200c and the light pipe of the light-mixing system 200b is substantially parallel to the light pipe of the light-mixing system 20d. Further, the pair of light mixing systems (200a/200c) are substantially orthogonal to the pair of light mixing systems (200b/200d). In some embodiments of the light array 200, the light-mixing systems 200a, 200b, 200c, and 200d can be positioned relative to one another such that the output light of the systems at least partially overlap when projected onto a desired target.

Figure 3A:
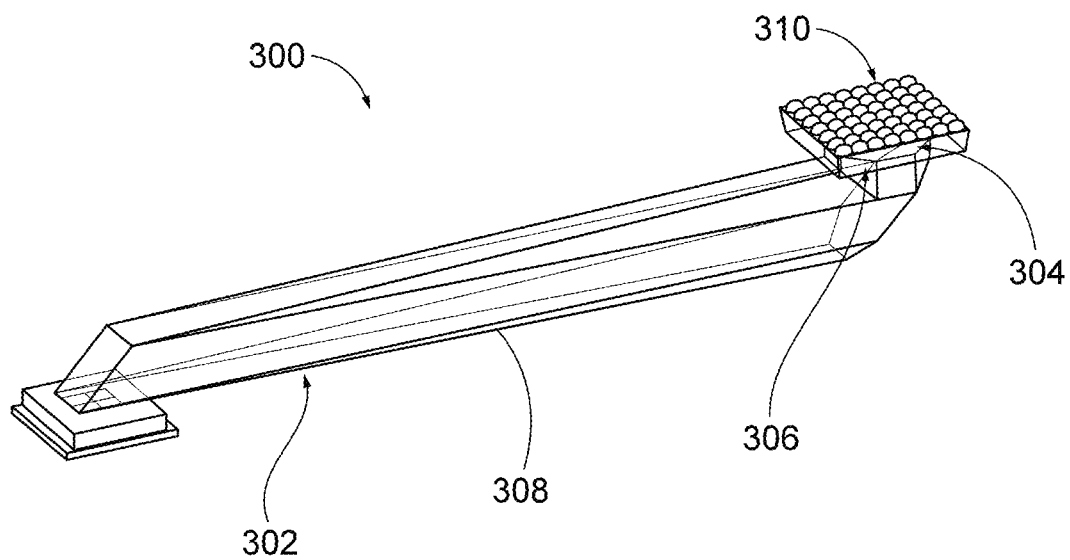
Figure 3B:
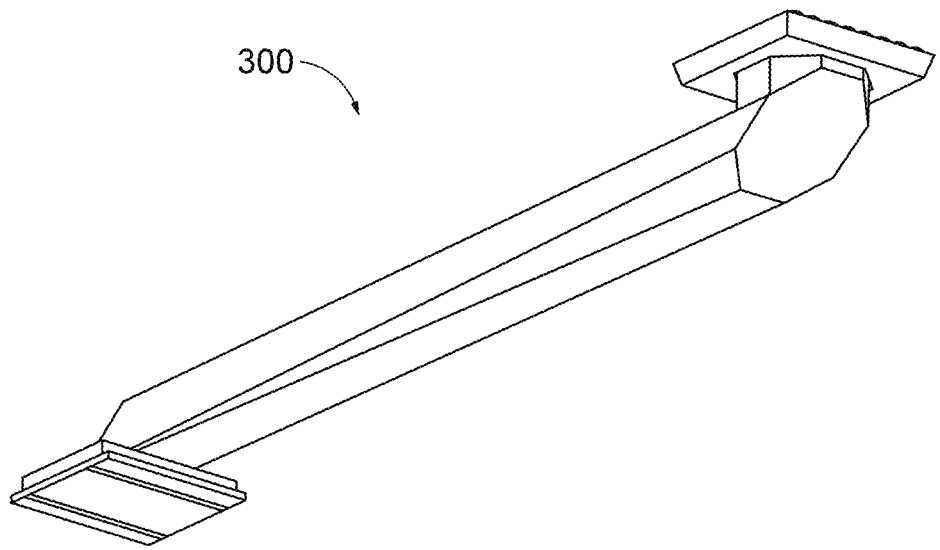

FIGS. 3A and 3B schematically depict another embodiment 300 of a light mixing system according to the present teachings. The light-mixing system 300 is similar to the light-mixing system IO discussed above except that the light pipe 302 employed in this system has an octagonal cross-sectional shape. Further, an output surface 304 of the light-mixing system 300 is disposed at the end of a segment 306 that protrudes above a light mixing segment 308 of a light pipe 302 of the light-mixing system. Similar to the previous embodiment, the light-mixing system 300 can include a plurality of microlenses and/or surface texturing 310 for diffusing and/or redirecting the light exiting the output surface 304. The light-mixing system 300 can optionally include a projection lens (not shown), such as a zoom lens, that can be optically coupled to the microlenses/surface texturing 310.

Figure 4A:
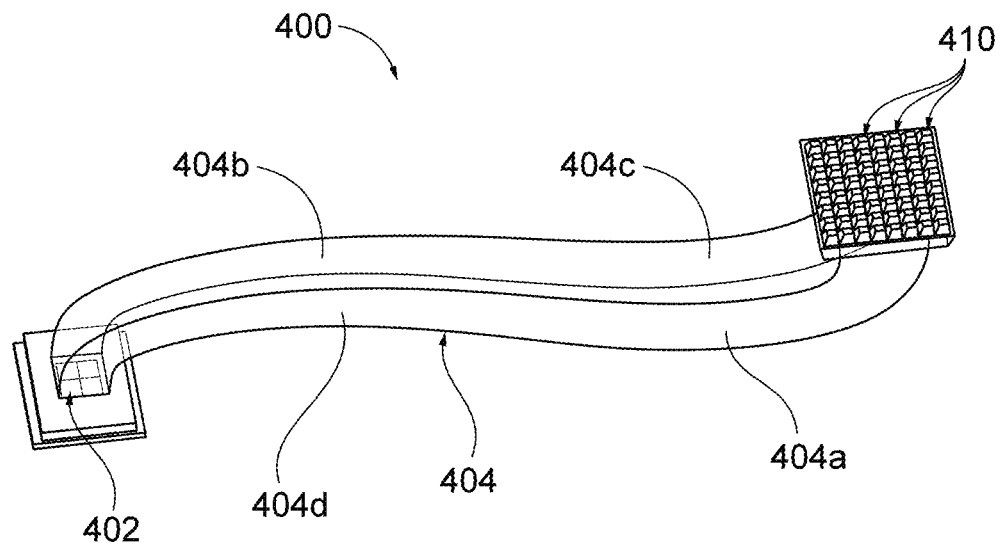
FIG. 4A is a schematic perspective view of a light-mixing system according to another embodiment of the present teachings.
Figure 4B:
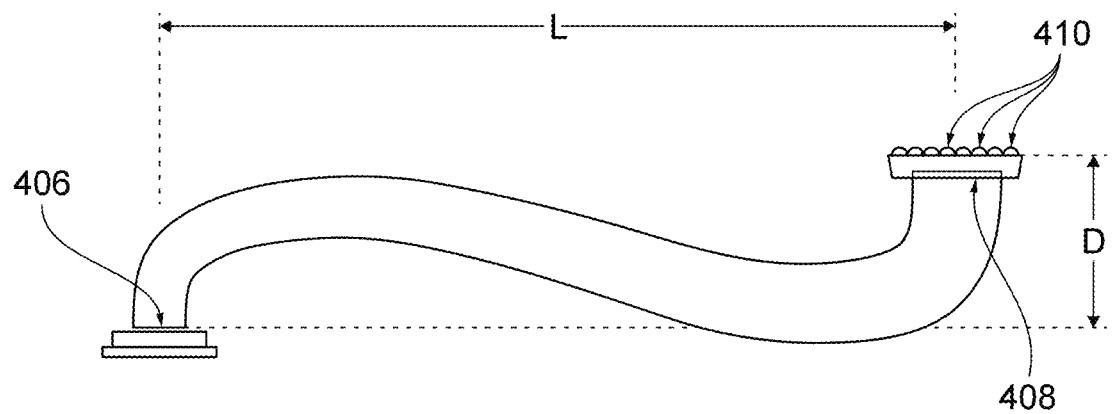
FIG. 4B is a schematic cross-sectional view of the light-mixing system depicted in FIG. 4A.

FIGS. 4A and 4B schematically depict another embodiment 400 of a light-mixing system according to the present teachings, which includes a light source 402 and a light pipe 404 to which the light source is optically coupled. The light pipe 404 has a curved profile and extends from an input surface 406 to an output surface 408. More specifically, in this embodiment, the light pipe 404 has a serpentine shape. Similar to the previous embodiment, the light source 402 is a multi-color LED, though other light sources can also be employed.

In this embodiment, the serpentine-shaped light pipe 404 includes surface portions 404a, 404b, 404c, and 404d (herein collectively referred to as surface portions 405) that are arranged to impart a square cross-sectional shape to the light pipe. The light emitted by the light source 402 enters the light pipe via the input surface 406 and undergoes total internal reflection at the peripheral surface portions 405 of the light pipe, thereby advancing along the light pipe to reach the output surface 408 through which the light exits the light pipe.

A plurality of microlenses 410 are coupled to the output surface 408 for diffusing and/or redirecting the light exiting through the output surface. In this embodiment, the microlenses are implemented as a separate unit (e.g., in a plastic substrate), which is attached to the output surface of the light pipe. In other embodiments, the output surface itself can carry the microlenses. In addition or alternatively, the output surface 408 can include surface texturing, such as that discussed above in connection with the previous embodiments.

With continued reference to FIGS. 4A and 4B, the input surface 406 and the output surface 408 are laterally separated from one another by a distance L and are vertically separated from one another by a distance D. In this embodiment, the ratio of D to L (D/L) can be, for example, in a range of 0 to about 1. In some embodiments, the lateral distance L can be, for example, in a range of about 20 mm to about 200 mm and the vertical distance D can be, for example, in a range of 0 to about 20 mm.

Figure 4C:
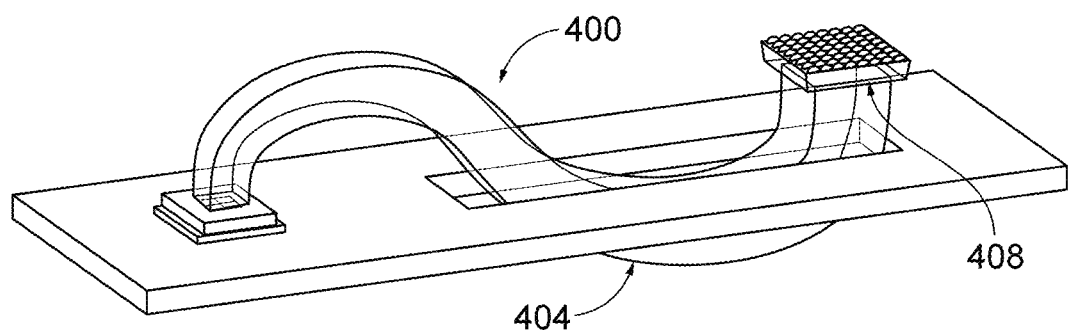
FIG. 4C is a schematic view of an implementation of the light-mixing system of FIG. 4A in which a portion of the light pipe is positioned vertically below the surface of the light source.
Figure 4D:
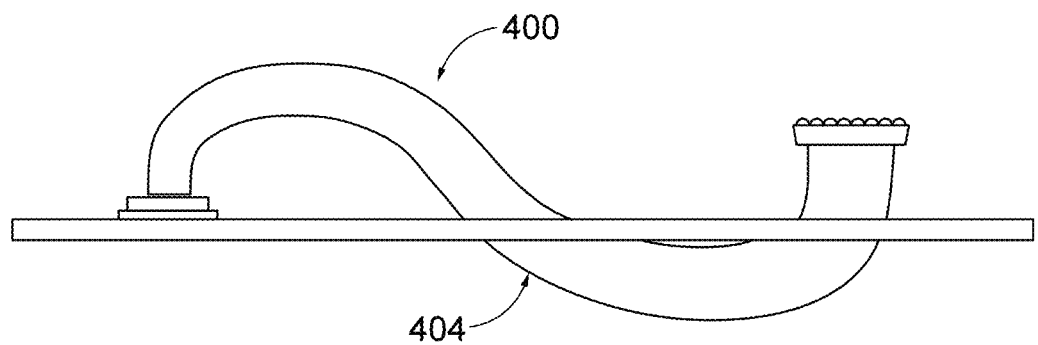
FIG. 4D is a cross-sectional view of the light-mixing system depicted in FIG. 4C.

As shown schematically in FIGS. 4C and 4D, in some embodiments, a portion of the light pipe 404 can be vertically below the surface of the light source 402. While in this embodiment, the height of the output surface 408 relative to the lowest point of the light pipe is greater than the height of the input surface 406, in other embodiments, the light pipe can be curved such that the height of the output surface 408 is less than that of the input surface 406.

Figure 4E:
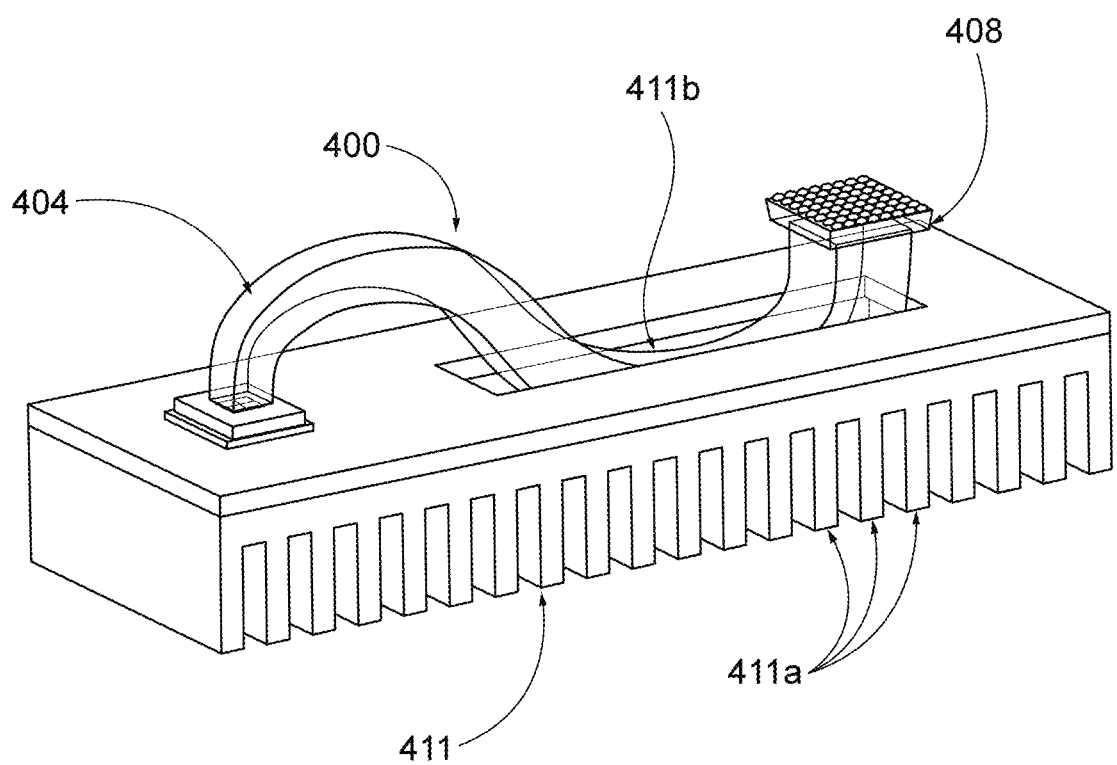
FIG. 4E is a perspective schematic view of an implementation of the light-mixing system of FIG. 4C in which a heat sink is coupled to be the light source.
Figure 4F:
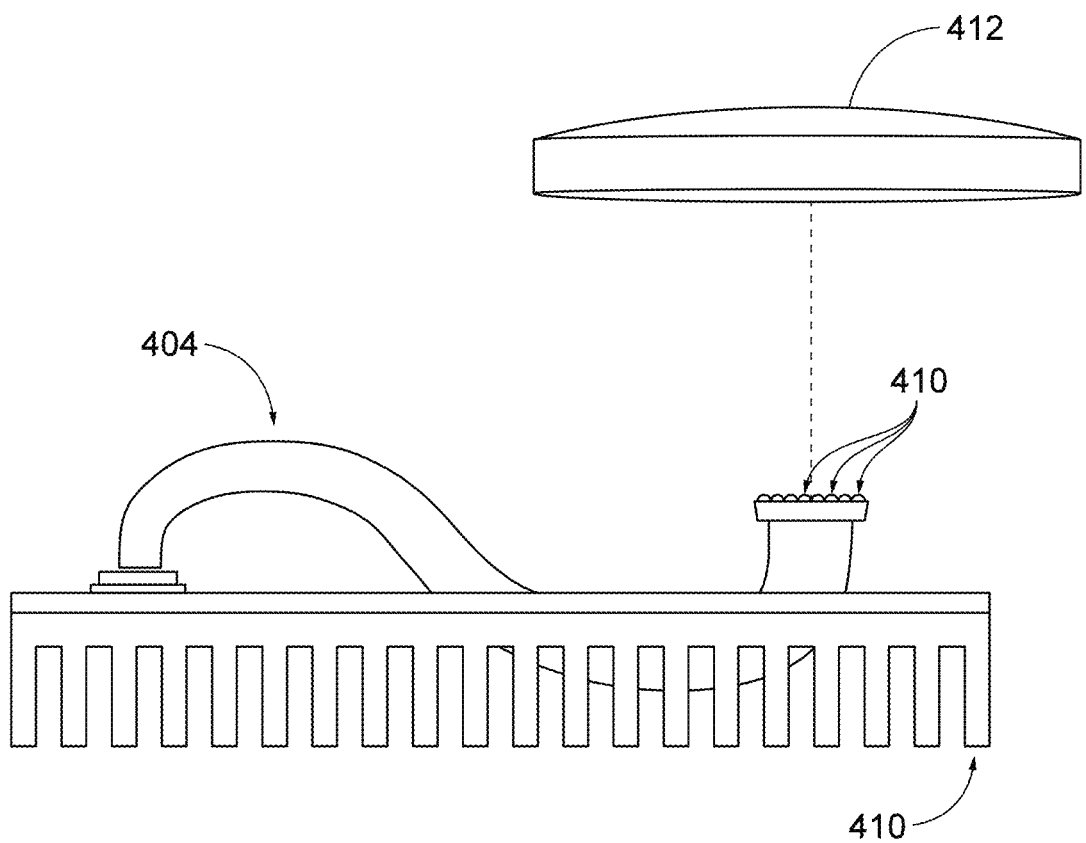
FIG. 4F is a cross-sectional schematic view of the light-mixing system depicted in FIG. 4E with the addition of a projection lens optically coupled to the output surface of the light pipe.

With reference to FIGS. 4E and 4F, in some embodiments, a heat sink 411 can be coupled to the light source 402 to facilitate removal of heat from the light source. In this embodiment, the heat sink 411 includes a plurality of fins 411a that provide an increased surface area from which the heat generated by the light source can be efficiently dissipated into the external environment. In this embodiment, the heat sink 411 includes an opening 411b that accommodates a portion of the light pipe 404 that is positioned vertically below the light source 402.

As shown schematically in FIG. 4F, in some embodiments, a lens 412 can be optically coupled to the microlenses 410 to receive the light exiting the light pipe 400, e.g., to project the light onto a target surface. In some embodiments, the lens 412 can function as a zoom lens. The use of a curved light pipe can provide certain advantages. For example, it can allow efficient light mixing by increasing the path length of the light through the light pipe while ensuring that the height of the system, which can be characterized by the vertical separation D between the input and output surfaces, is significantly less than the height of a conventional system providing the same degree of light mixing.

FIGS. 5A, 5B, 5C, 5D schematically depict a light-mixing system 500 according to another embodiment, which includes a hemispherically-shaped light pipe 502 that extends from an input surface 502a to an output surface 502b. In this embodiment, the hemispherically-shaped light pipe 502 includes four peripheral surfaces, such as surfaces 503a, 503b, and 503c (the surface opposed to the surface 502c is not visible in this figure), which are herein referred to collectively as peripheral surfaces 503. The peripheral surfaces 503 impart a square cross section to the light pipe, though in other embodiments the cross-sectional shape of the light pipe can be different, e.g., hexagonal, or octagonal. Similar to some of the previous embodiments, the peripheral surfaces 503 are configured so as to reflect, via total internal reflection, the light incident thereon. Further, similar to some of the previous embodiments, a plurality of microlenses 504 are coupled to the output surface 502b to diffuse and/or redirect the light exiting the light pipe via the output surface. Again, similar to some of the previous embodiments, in addition to or instead of the microlenses, the output surface 502b can include surface texturing for diffusing the light exiting the light pipe via the output surface. Further, similar to the previous embodiment, a projection lens, such as a zoom lens, can be optionally optically coupled to the microlenses 504 to receive light therefrom and direct the received light onto a target surface.

The input surface is optically coupled to a light source 506, which can be, for example, a multi-color LED such as an RGBW. In this embodiment, the general direction along which the light from the light source enters the light pipe is substantially opposite to the general direction along which the light exits the light pipe via the output surface 502b.

In some implementations, the light-mixing system 500 can transfer light received at its input surface to its output surface with an efficiency as high as about 74%, or as high as about 80%, or as high as about 90%.

Figure 5A:
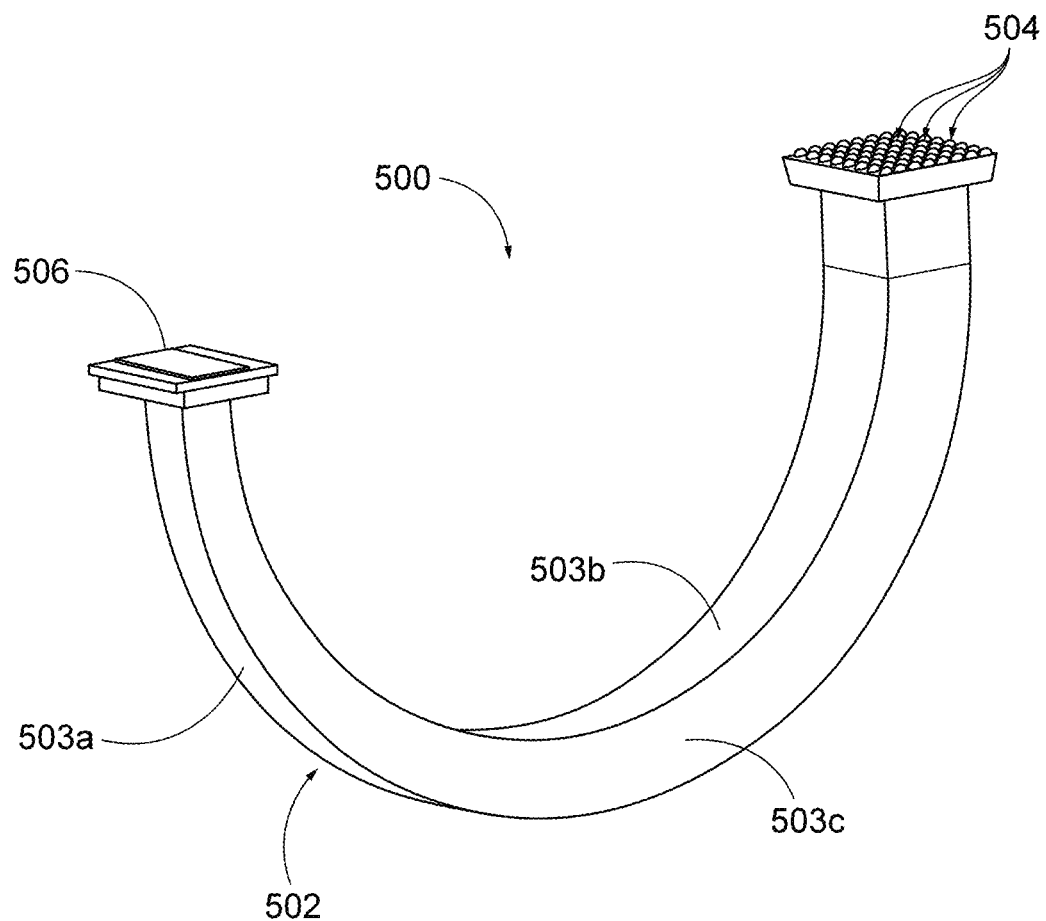
FIG. 5A is a schematic perspective view of a light-mixing system according to another embodiment of the present teachings.
Figure 5B:
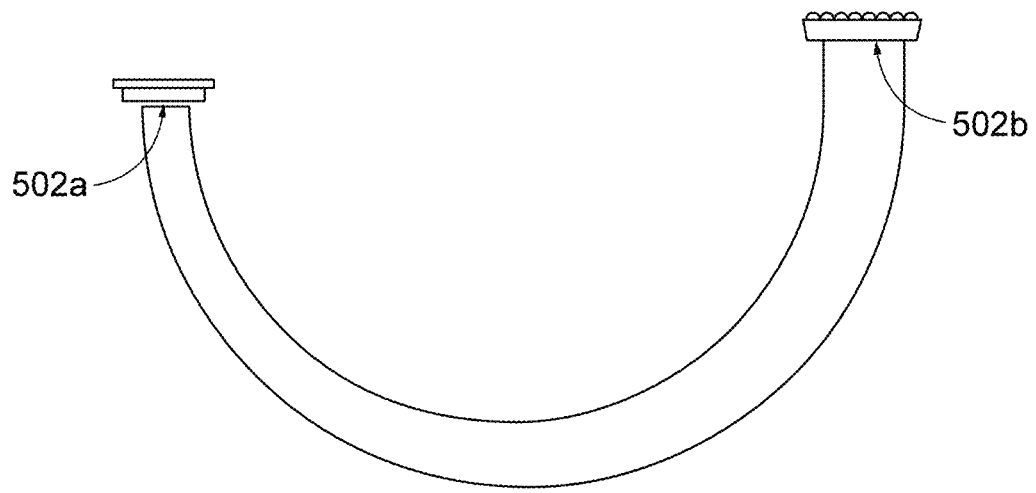
FIG. 5B is a schematic cross-sectional view of the light-mixing system depicted in FIG. 5A.
Figure 5C:
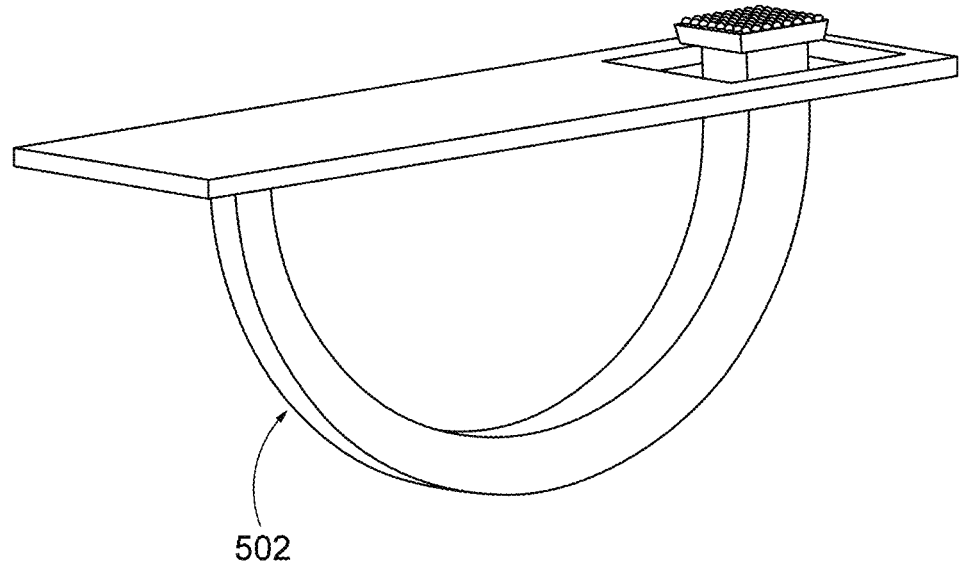
FIG. 5C is another schematic view of the light-mixing system depicted in FIG. 5A.
Figure 5D:
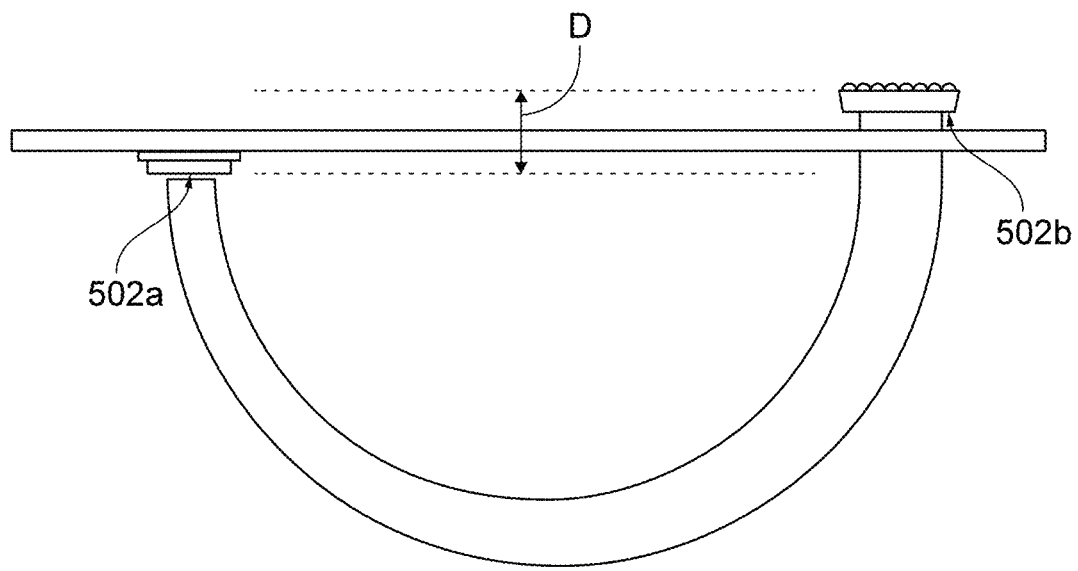
FIG. 5D is another schematic view of the light-mixing system depicted in FIG. 5A, FIG. 5E schematically depicts an embodiment of the light-mixing system of FIG. 5A in which a heat sink is thermally coupled to the light source.

In this embodiment, the input surface 502a and the output surface 502b are vertically separated from one another. By way of example, as shown in FIGS. 5C and 5D, the input surface 502a and the output surface 502b are vertically separated from one another by a distance (D). While in this embodiment, the output surface is vertically disposed above the input surface, in other embodiments, the output surface 502b can be vertically positioned below the input surface.

Figure 6A:
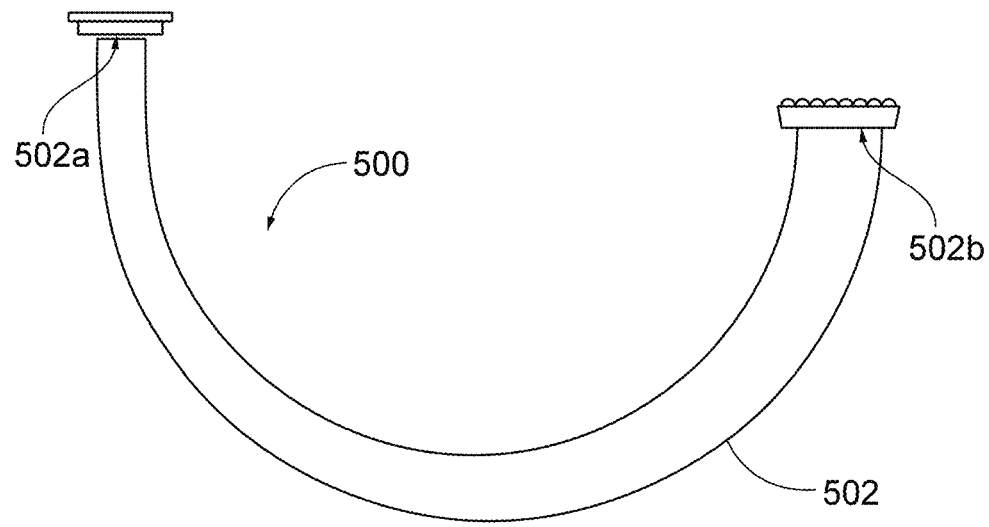
FIG. 6A is a schematic view of a light-mixing system according to another embodiment of the present teachings.
Figure 6B:
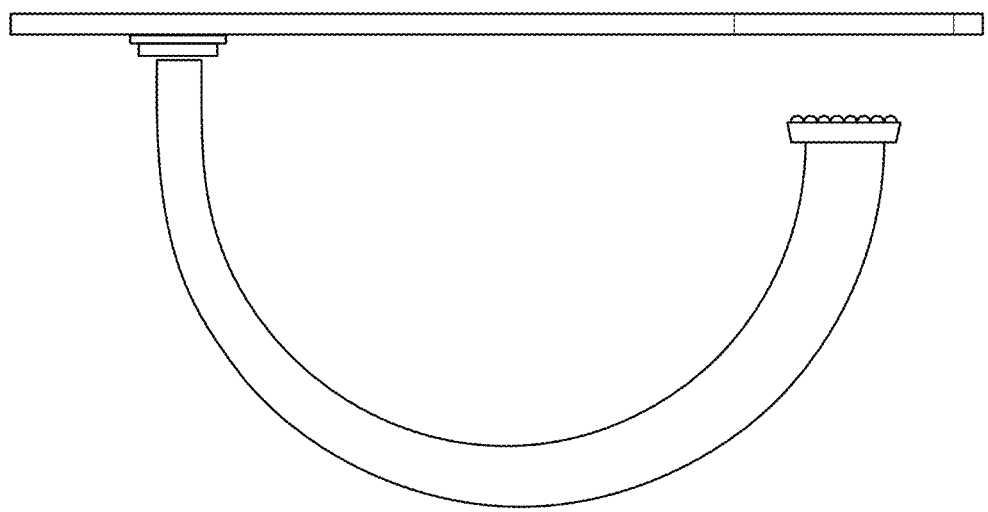
FIG. 6B is a schematic view of another implementation of the light-mixing system depicted in FIG. 6A.

By way of example, FIGS. 6A and 6B schematically depict another embodiment of the light mixing system 500 in which the output surface 502b is vertically positioned below the input surface 502a. In general, as the length of the arcuate light-mixing waveguide between the input and output surfaces increases, so does the light mixing capability of the optical system.

Figure 5E:
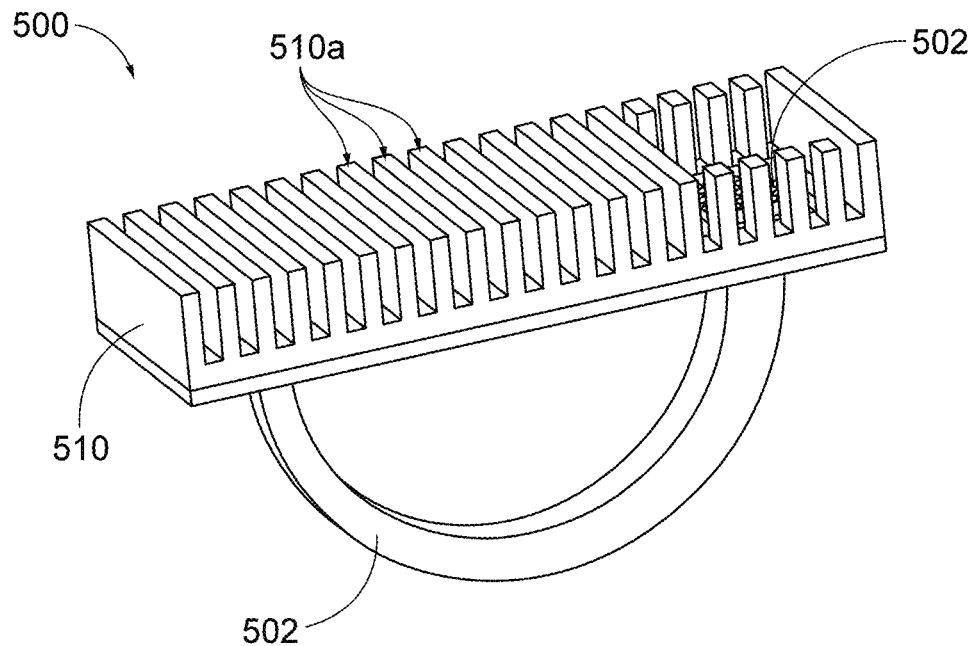
FIG. 5F is another schematic view of the light-mixing system of FIG. 5E.
Figure 5F:
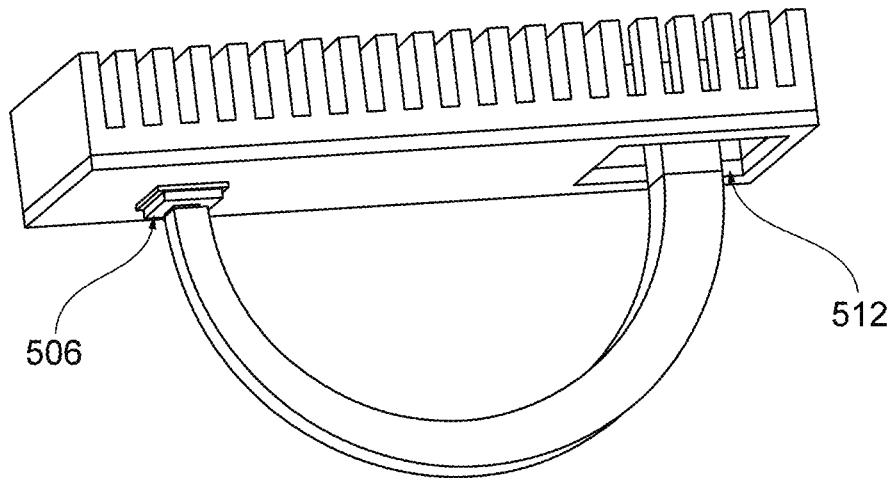

With reference to FIGS. 5E and 5F, in some embodiments, the light-mixing system 500 includes a heat sink 510 that is thermally coupled to the light source 506 for removing heat therefrom. The heat sink 510 can include a plurality of fins 510a for facilitating the removal of heat from the light source 506. As in this embodiment the output surface 502b of the light pipe 502 is positioned vertically above the light source 506, the heat sink includes an opening 512 through which the distal end of the light pipe extends.

Figure 6C:
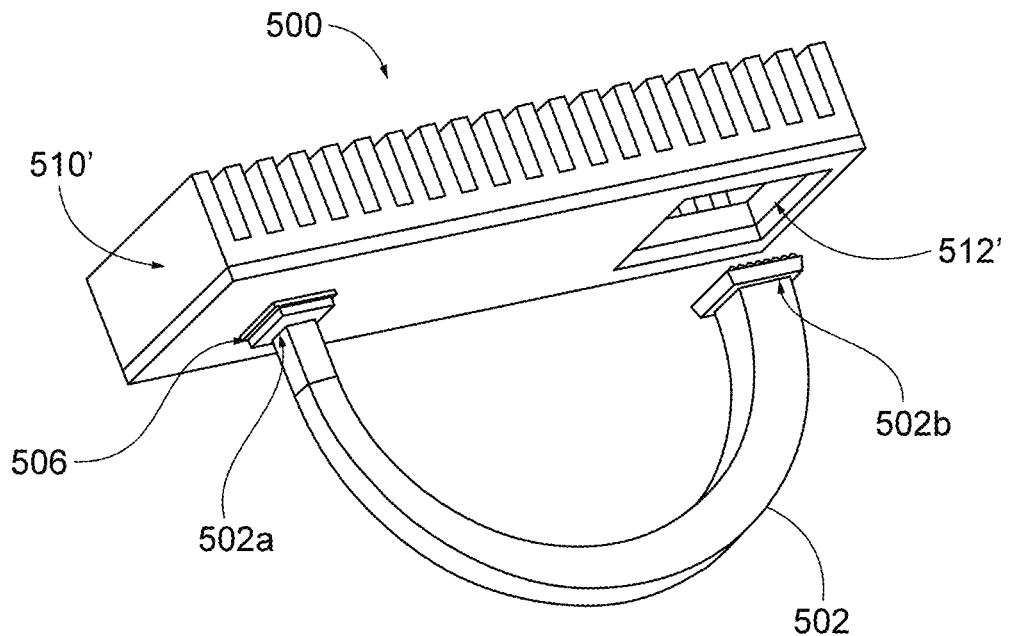
FIG. 6C is a schematic view of an embodiment of the light-mixing system of FIG. 6A in which a heat sink is thermally coupled to the light source.
Figure 6D:
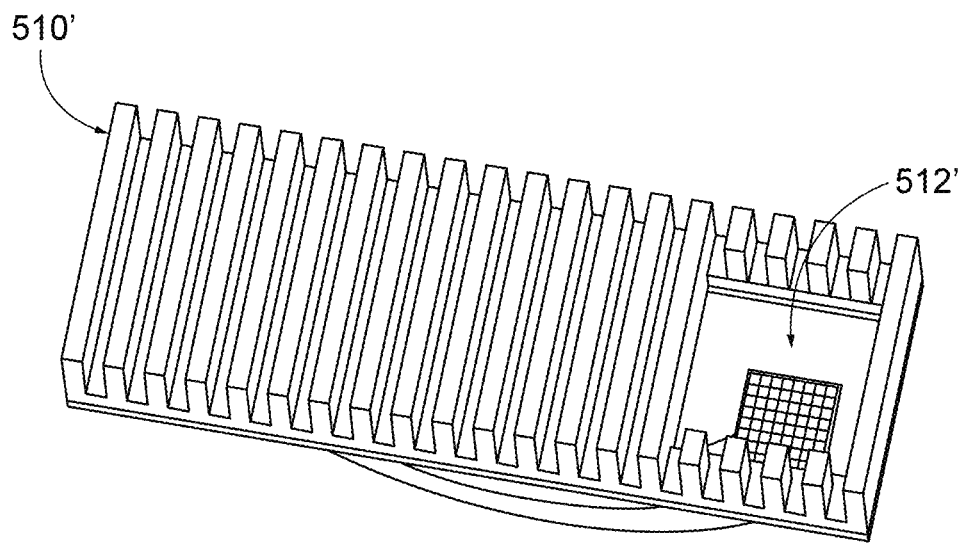
FIG. 6D is another schematic view of the light-mixing system depicted in FIG. 6C.

FIGS. 6C and 6D depict another embodiment of the light-mixing system 500 in which the output surface 502b of the light pipe 502 is positioned vertically below the input surface 502a and a heat sink 510' is thermally coupled to the light source 506 to facilitate the removal of heat generated by the light source. The heat sink 510' includes an opening 512' that allows the passage of light exiting the light pipe 502 via its output surface 502b to the external environment.

Figure 6E:
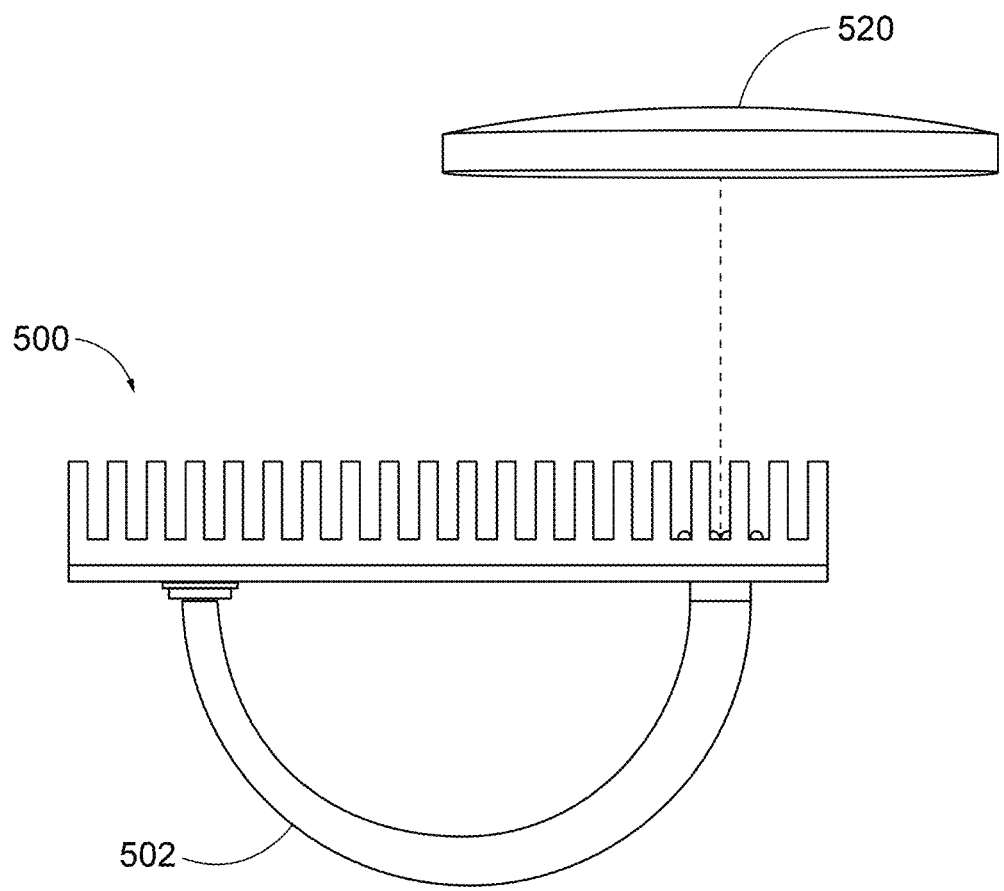
FIG. 6E is a schematic view of an embodiment of the light-mixing system of FIG. 6A in which a projection lens is optically coupled to the output surface of the light pipe.

FIG. 6E schematically depicts an embodiment of the light-mixing system 500 in which a lens 520 is optically coupled to the output surface of the light pipe 502 to shape and/or redistribute the light rays, e.g., to focus the light rays onto a target surface. In some embodiments, the lens 520 can be a zoom lens, e.g., a zoom lens formed by a pair of lenses having positive and negative optical powers.

Figure 7:
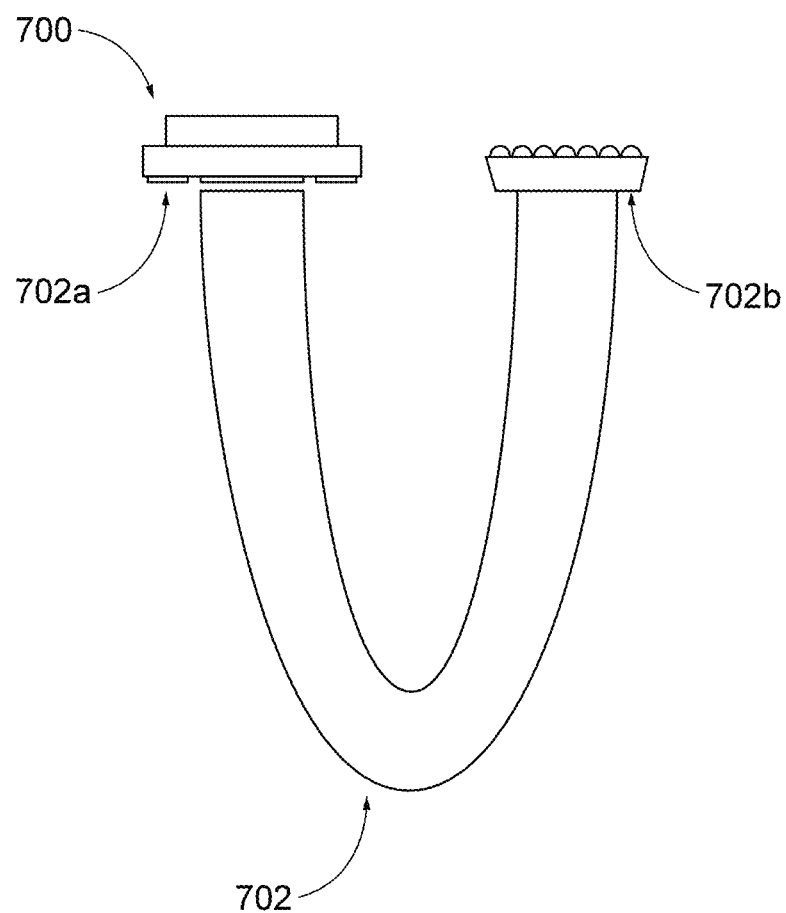
FIG. 7 is a schematic view of a light-mixing system according to another embodiment of the present teachings.

By way of further illustration, FIG. 7 schematically depicts another embodiment of a light-mixing system 700 having a curved light pipe (light-guiding waveguide) 702 that extends from an input surface 702a, which can receive light from a light source (not shown in this figure), to an output surface 702b through which the light can exit the light pipe. In this embodiment, the input and the output surfaces are placed side-by-side in close proximity to one another. In other embodiments, the light pipe can be configured such that the input and the output surfaces are placed side-by-side and in contact with one another. In other words, each of the lateral and the vertical distance between the input and the output surface can be zero.

With reference to FIGS. 8A, 8B, and 8C, in some embodiments, a light mixing system 800 includes a light pipe 802 that extends from an input surface 802a to an output surface 802b. In this embodiment, the light pipe 802 forms an arc such that the input and output surfaces 802a and 802b are oriented at a 90-degree angle relative to one another. In other words, putative vectors normal to the input and output surfaces 802a and 802b are orthogonal to one another. Thus, the light pipe can redirect an input beam by 90 degrees to illuminate a desired target surface. The input surface 802a is optically coupled to a light source 804, which can be, for example, an LED or a combination of LEDs providing light of different colors. The light rays entering the light pipe 802 undergo total internal reflection at the peripheral surfaces of the light pipe to reach the output surface 802b. While in this embodiment the light pipe has a square cross-sectional profile, in other embodiments, it can have other cross-sectional profiles, such as hexagonal or octagonal.

In this embodiment, a plurality of microlenses 805 are optically coupled to the output surface of the light pipe 800 to redistribute and/or reshape the light as it exits the output surface. In some embodiments, the surfaces of the microlenses can be textured, for example, in a manner discussed above in connection with the previous embodiments. By way of example, such surface texturing can be characterized by a plurality of projections having heights in a range of about 0.01 mm to about 1 mm. In other embodiments, such surface texturing can be applied to the output surface 802b in absence of any microlenses. In this embodiment, the microlenses are formed in a separate unit 807, e.g., a plastic unit, that is then coupled to the output surface 802b. In other embodiments, the microlenses can be incorporated into the output surface 802b.

Figure 8D:
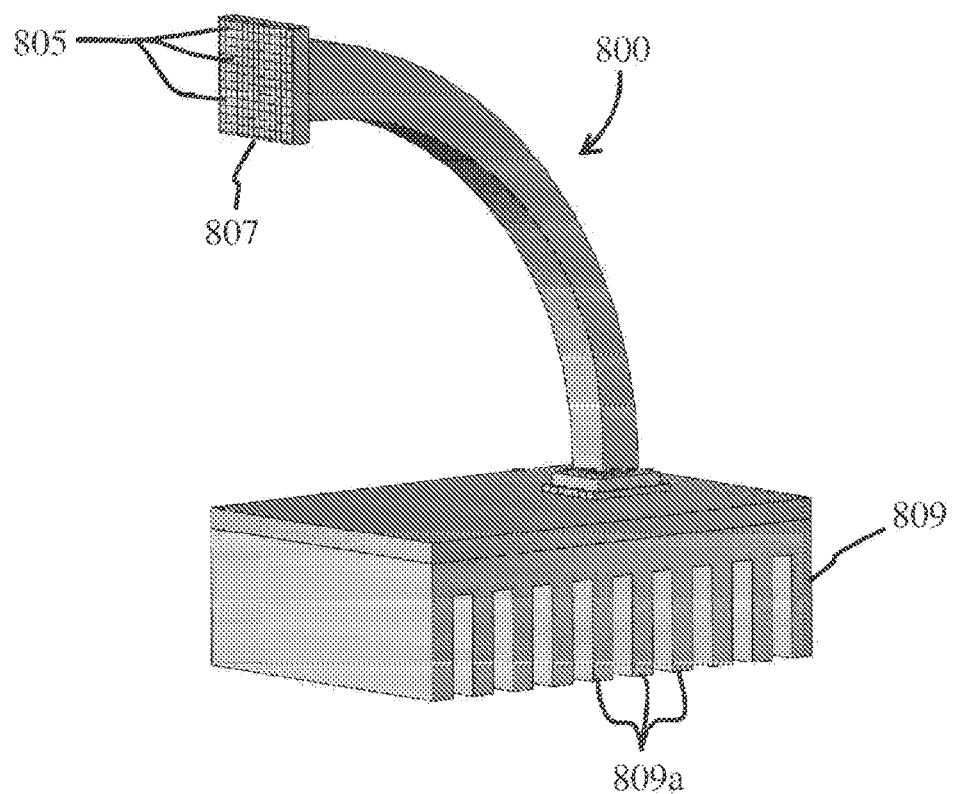
FIG. 8A is a schematic view of a light system according to an embodiment in which the input and output surface are oriented at a 90-degree angle relative to one another.
FIG. 8B is a perspective schematic view of the light system depicted in FIG. 8A.
FIG. 8C is another perspective schematic view of the light system depicted in FIG. 8A, illustrating a plurality of microlenses that are optically coupled, FIG. 8D schematically depicts an embodiment of the light system shown in FIG. 8A in which a heat sink in thermally coupled to a light source providing light to the light pipe of the light system.
FIG. 8E is a cross-sectional schematic view of the light system illustrated in FIG. 8D, FIG. 8F schematically illustrates a light system according to an embodiment in which a projection lens is optically coupled to an output surface of a light pipe of the light system.
FIG. 8G is a perspective schematic view of the light system depicted in FIG. 8F.
Figure 8E:
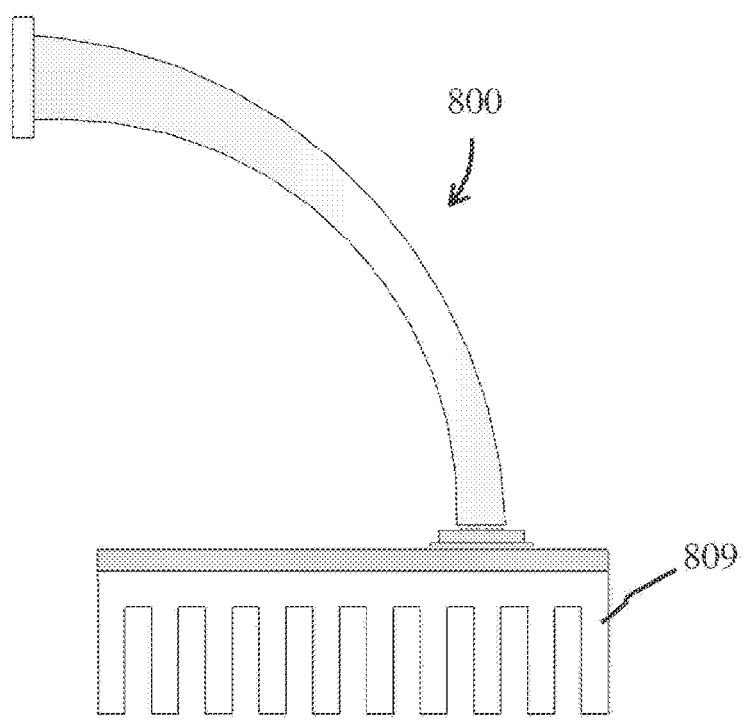

With reference to FIGS. 8D and 8E, in some embodiments a heat sink 809 can be thermally coupled to the light source 804 to remove heat generated by the light source. The heat sink 809 includes a plurality of fins 809a that provide a large surface area for facilitating the removal of heat from the light source.

Figure 8F:
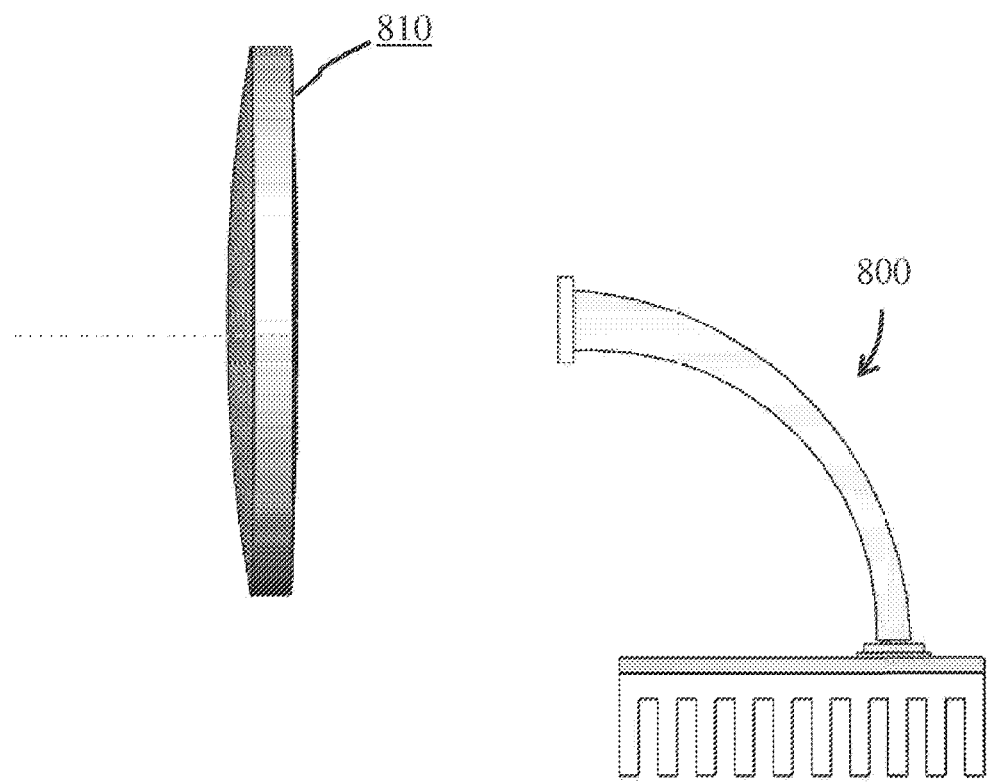
Figure 8G:
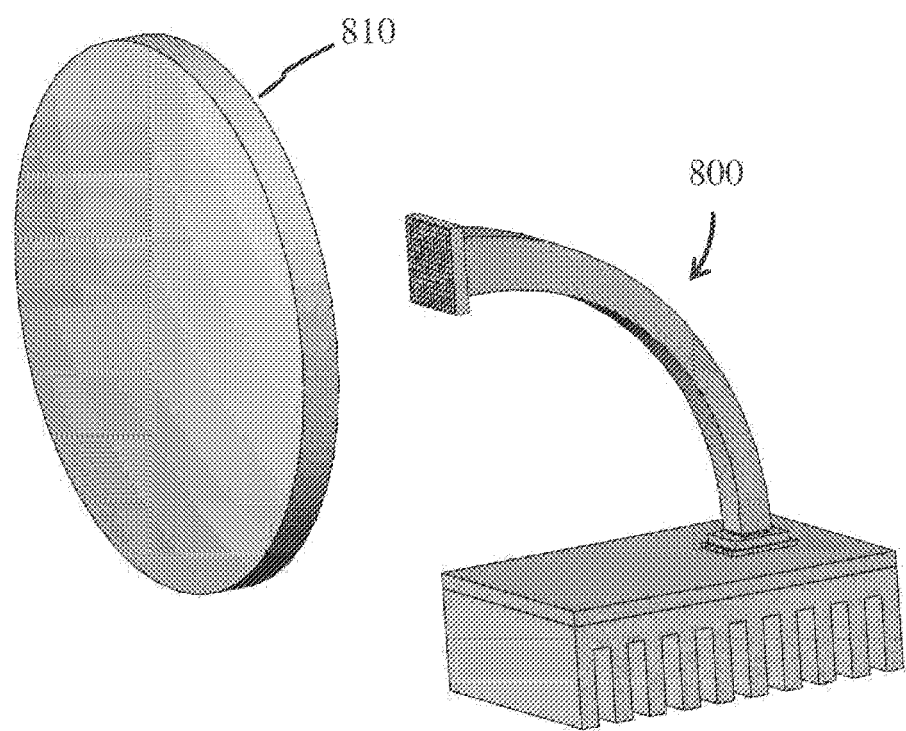

FIGS. 8F and 8G schematically depict that in some embodiments, a projection lens 810 can be optically coupled to the output surface 802b of the light pipe to project the light exiting the output surface onto a target area. In some embodiments, the projection lens can function as a zoom lens. For example, in some embodiments, the projection lens can be in the form of a lens doublet, one of which has a positive optical power and the other a negative optical power, and can be movable relative to the output surface 802b so as to adjust the angular spread of a light beam exiting the output surface 802b, e.g., between a narrow-beam and wide-beam angular spreads.

With reference to FIGS. 9A, 9B and 9C, in another embodiment, an optical system 900 includes a light pipe 902 that extends from an input surface 902a to an output surface 902b. In this embodiment, the light pipe is bent such that a putative vector A perpendicular to the output surface 902b forms a 45-degree angle with a putative vector A perpendicular to the input surface 902a. The light pipe 902 receives light from a light source 904 at its input surface 902a and directs the light via total internal reflection at its peripheral surfaces to the output surface 902b through which the light exits the light pipe. In some embodiments, the light source 904 can be an LED or a plurality of LEDs, e.g., LEDs providing light of different colors.

A plurality of microlenses 905 are optically coupled to the output surface 902b to redirect and/or shape the light exiting the light pipe. While in this embodiment, the microlenses 905 are formed in a separate unit 905a that is coupled to the output surface 902b, in other embodiments the microlenses can be incorporated in the output surface. Further, in some embodiments, the surfaces of the microlenses can be textured, e.g., in the form of a plurality of projections having a height in a range of about 0.01 mm to about 1 mm. In other embodiments, such surface texturing can be incorporated in the output surface 902b in absence of the microlenses.

Figure 9D:
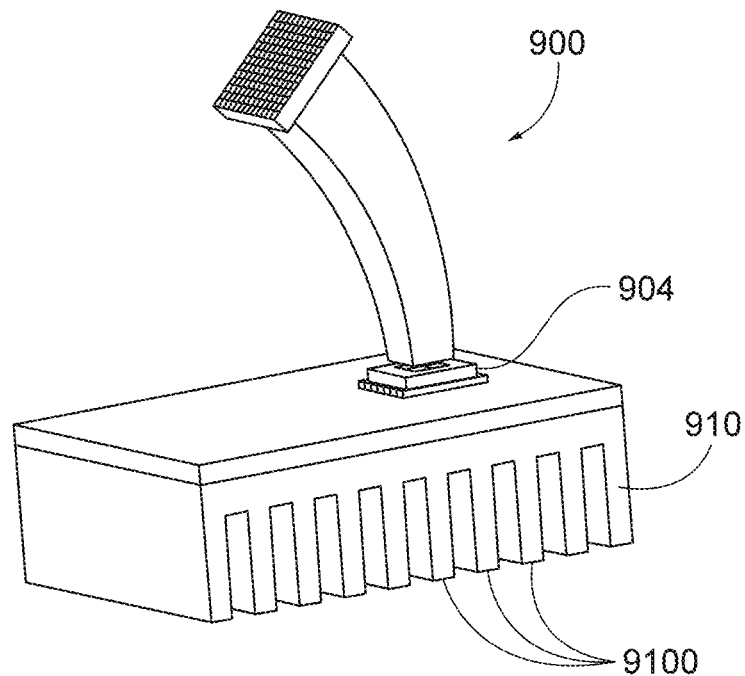
FIG. 9D is a schematic perspective view of an embodiment of the light system illustrated in FIG. 9A in which a heat sink is thermally coupled to a light source of the light system.
Figure 9E:
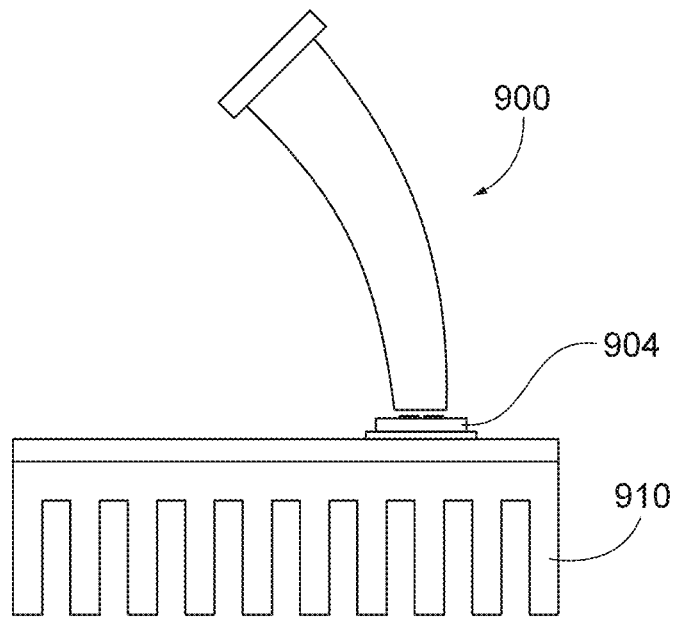
FIG. 9E is a schematic cross-sectional view of the light system shown in FIG. 9D.

With reference to FIGS. 9D and 9E, in some embodiments, a heat sink 910 can be thermally coupled to the light source 904 to remove heat generated by the light source. The heat sink 910 can include a plurality of fins 910a that facilitate heat removal from the light source by providing an increased surface area.

Figure 9F:
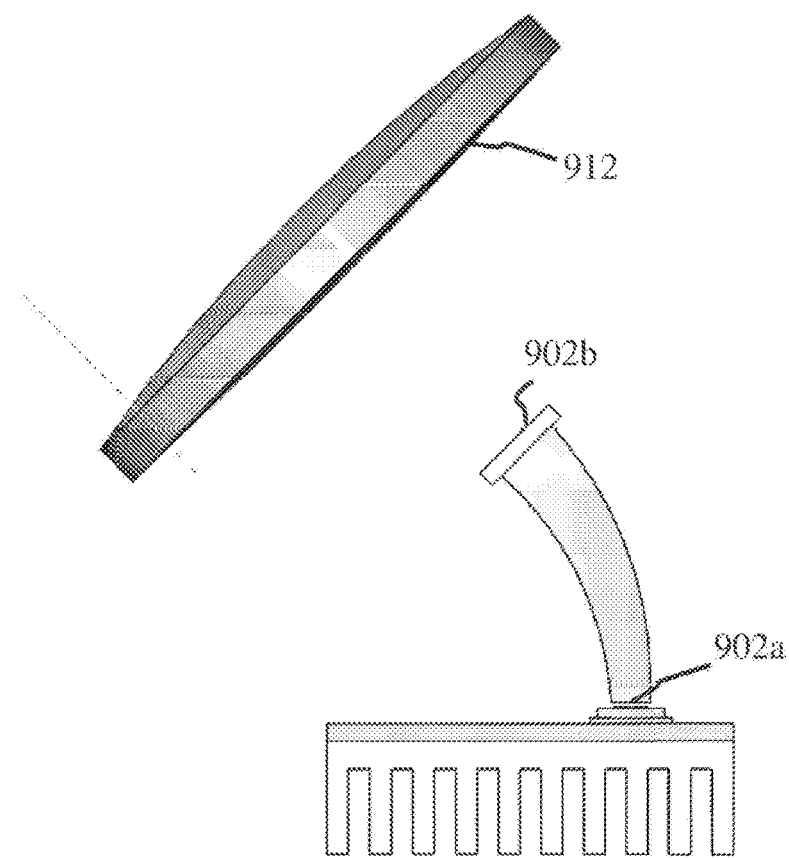
FIG. 9F is a schematic view of an embodiment of the light system of FIG. 9A in which a projection lens is optically coupled to the output surface of a light pipe of the light system.
Figure 9G:
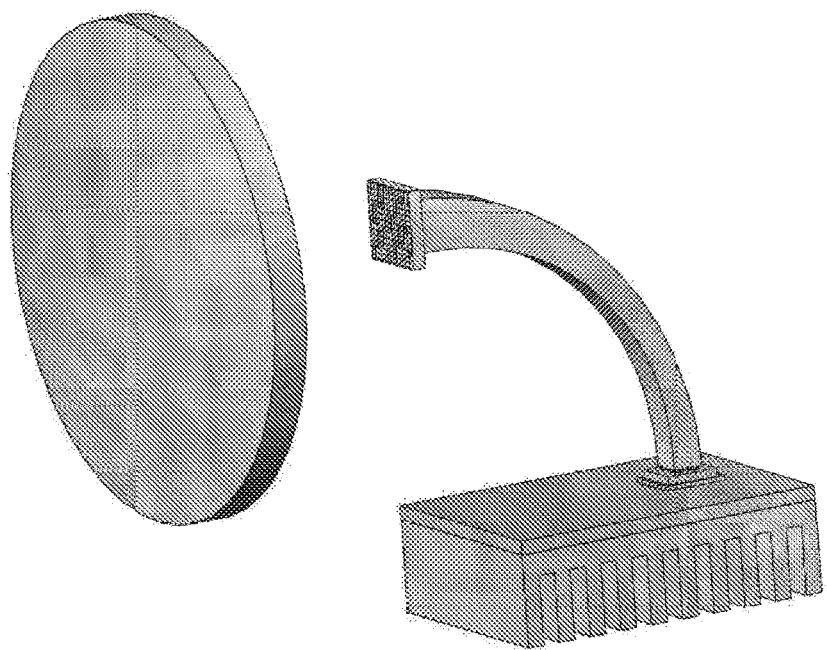
FIG. 9G is a schematic perspective view of the light system depicted in FIG. 9F, FIG. 10 schematically depicts a light pipe having a tapered cross section exhibiting a progressively increasing surface area from its input surface to its output surface, and FIG. 11 schematically depicts a light pipe for use in a light-mixing system according to the present teachings, which exhibits different cross-sectional shapes along its length.

With reference to FIGS. 9F and 9G, in some embodiments a projection lens 912 can be optically coupled to the output surface 902b to project the light received from the light pipe onto a target surface. In some embodiments, the projection lens can be a zoom lens.

While in the above two embodiments, the input and output surfaces of the light pipe are oriented relative to one another by 90 and 45 degrees, more generally, the input and output surfaces of the light pipe of a light-mixing system according to the present teachings can form an angle from 0 and 90 degrees, e.g., in a range of about 30 to 90 degrees, relative to one another. In other words, putative vectors normal to the input and output surfaces of the light pipe can make an angle in a range of 0 and 90 degrees, e.g., in a range of about 30 to 90 degrees, relative to one another.

In some implementations of any of the above embodiments, the input and the output surfaces of the light pipe of a light-mixing system according to the present teachings can have different surface areas. By way of example, as shown schematically in FIG. 8A, the output surface 802b of the light pipe 802 has a surface area greater than the surface area of the input surface 802a. By way of example, in some embodiments, the output surface can have a surface area that is at least about 10%, or at least about 20%, or at least about 30%, or at least about 40%, or at least about 50%, greater than the surface area of the input surface of the light pipe.

Figure 10:
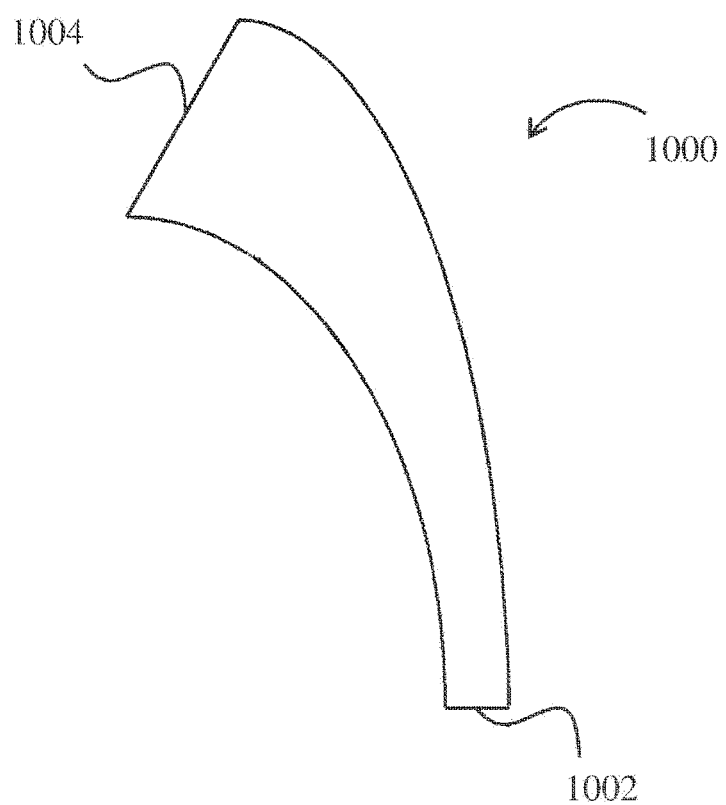

Further, in some implementations of any of the above embodiments, the light pipe of a light-mixing system according to the present teachings can have a tapered cross-sectional profile extending from the input surface to the output surface. By way of example, with reference to FIG. 10, a light pipe 1000 exhibits a cross-sectional area that continuously increases from an input surface 1002 to an output surface 1004. In other embodiments, the cross-sectional area of a light pipe of a light-mixing system according to the present teachings can be uniform along the length of the light pipe.

Figure 11:
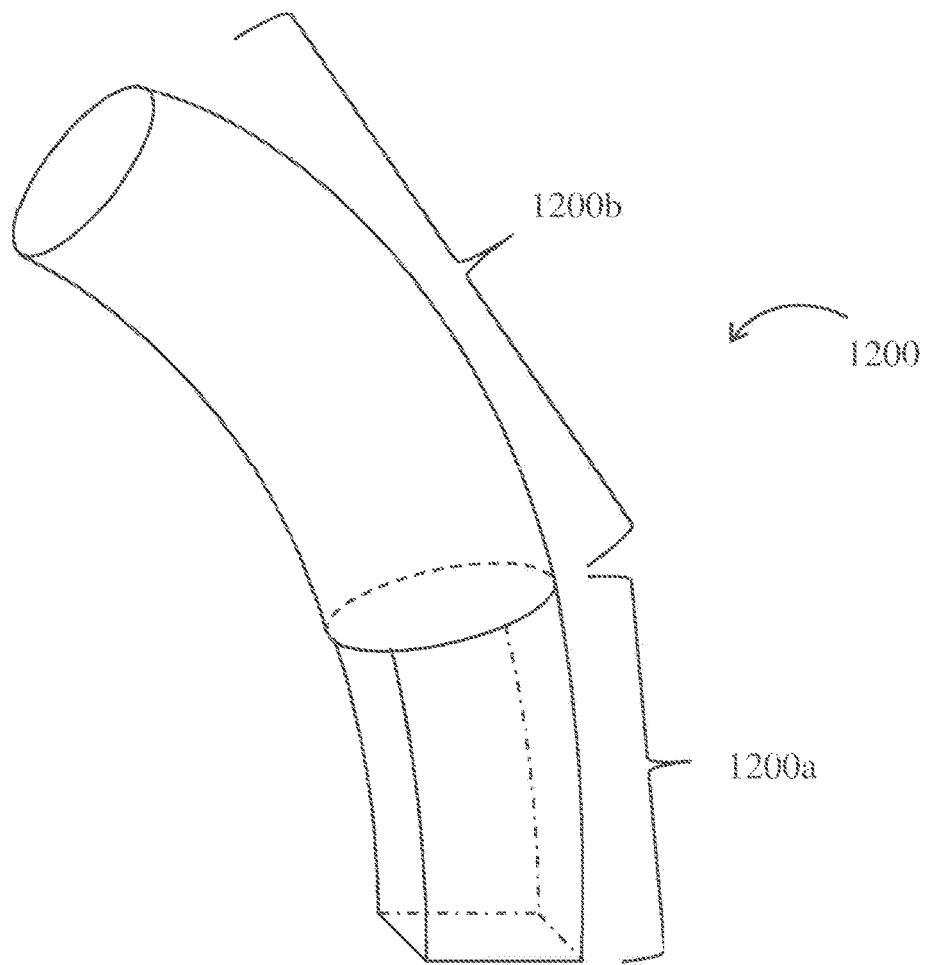

In some implementations of any of the above embodiments, different portions of a light pipe of a light-mixing system according to the present teachings can have different cross-sectional shapes. For example, a portion of the light pipe can have one polygonal shape, e.g., square, and another portion of the light pipe can have a different polygonal shape, e.g., hexagonal. Alternatively, a portion of the light pipe, e.g., a proximal portion, can have a polygonal cross section and another portion of the light pipe, e.g., a distal portion, can have a round cross section. By way of example, FIG. 11 schematically depicts a light pipe 1200 having a proximal section 1200a with a square cross section and a distal section 1200b having a round cross section. In other embodiments, the light pipe can exhibit more than two cross-sectional shapes along its length.

In the above embodiments, various components of a light-mixing system according to the present teachings, such as the light pipe, the projection lens, can be formed of any suitable material. Some examples of suitable materials include, without limitation, polymers, such as PMMA (polymethylmethacrylate) or similar polymer, silicone, glass, among others.

The curved light pipes in the above embodiments can advantageously increase the path length of the light propagating through them, thereby enhancing light mixing, while ensuring that the height of the system can be less than that of a conventional system providing a similar degree of light mixing.

Some embodiments, as described below in more detail, provide a light pipe that combines one or more sections of a first type that have circular cross sections with one or more sections of a second type that have polygonal cross sections. In some of these embodiments, one or more of the sections of the first type are included as sections that are more proximate to the input surface as compared to one or more of the sections of the second type. In various embodiments the sections of the first type may be easier or less expensive to manufacture, and at the same time may provide some color mixing. The sections up to the second type, on the other hand, may provide a higher level of color mixing as compared to the sections of the first type.

In various embodiments, a light pipe may include at least two sections having different cross sectional shapes or profiles. For example, at least one of the sections may have a curved profile, i.e., at least one lateral surface having a non-zero curvature extending between its input and output surfaces.

In some embodiments, one of the sections may be an input section, having an input surface through which a light source delivers light to the light pipe. The light pipe may further include one or more additional sections including an output section having an output surface. The light pipe may mix the received light by one or more of its sections and transmit the light to the output surface through which the light may exit the light pipe.

In some such embodiments, the input section may have a circular cross section and the output section may have a polygonal cross section. As discussed below, different sections such as the input and the output sections may be formed of the same or different materials. By way of example, both input and the output sections may be formed of glass or a plastic. In other embodiments, the input section may be formed of glass and the output section may be formed of a plastic. Further in various embodiments, the output surface may include texturing or a plurality of microlenses for causing additional mixing of the light exiting through the output surface.

Figure 12A:
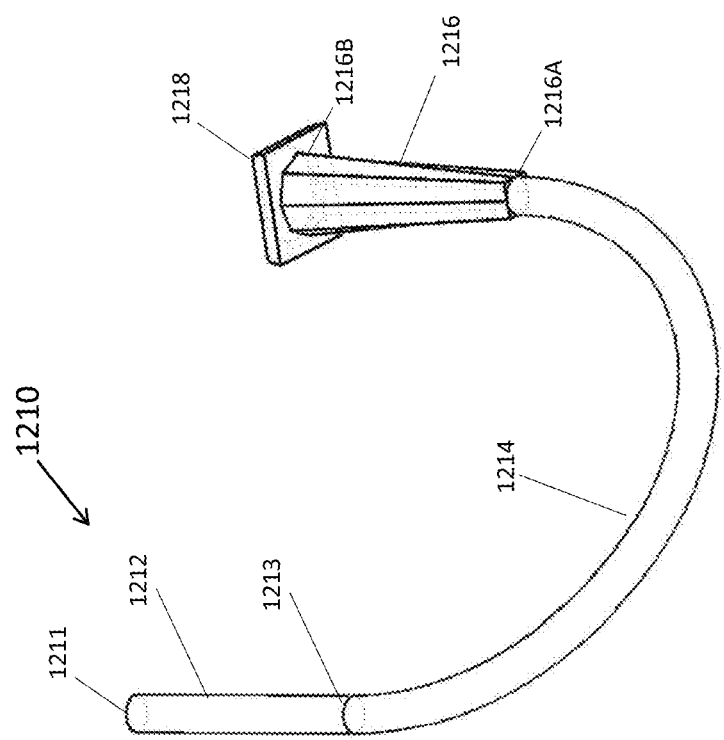
FIG. 12A shows a light pipe 1210 that combines sections with different types of cross sections according to some embodiments.

FIG. 12A shows a light pipe 1210 that combines sections with different types of cross sections according to some embodiments. In various embodiments, the term cross section of a section at a point is used to indicate a cross section of the section on a plane that is perpendicular to the longitudinal axis of the section at that point. Light pipe 1210 includes an input surface 1211, an input section 1212, a middle section 1214, an output section 1216, and an output surface 1218. In some embodiments, the combination of input section 1212, middle section 1214, and output section 1216 provides light mixing and is therefore termed the light-mixing segment of light pipe 1210. Moreover, in some embodiments, the input surface may be the proximal surface of the input section through which the input section receives light from one or more light sources. Moreover, the output surface may be the distal surface of the output section through which light exits the output section and the light pipe. Moreover, the input section may have an output surface 1213 through which light exits the input section and is delivered to the next section (in this case middle section 1214).

Input section 1212 has a circular cross section and a straight profile. In some embodiments, input section 1212 is configured to receive light generated by a light source through input surface 1211.

Middle section 1214 is optically coupled to, and configured to receive light from, input section 1212. Middle section 1214 has a circular cross section that matches the circular cross section of input section 1212. Moreover, middle section 1214 has a curved profile. In particular, middle section 1214 has a U-shaped profile. In various embodiments the U-shaped profile may be in the form of a section of a circle, for example, a semicircle covering a 180° section of a circle or sections of a circle covering angles larger than or smaller than 180°. In some embodiments, a light pipe with a U-shaped profile (such as light pipe 502 above) may be termed a hemispherically-shaped light pipe.

Output section 1216 has a flared polygonal cross section and a straight profile. More particularly, output section 1216 has two end surfaces, a first end surface 1216A and a second end surface 1216B. At first end surface 1216A, output section 1216 is attached, and optically coupled, to middle section 1214; and at second end surface 1216B, output section 1216 overlaps or forms output surface 1218. Further, output section 1216 has a hexagonal cross section that is flared. More specifically, first end surface 1216A has a hexagonal cross section with an area that is approximately equal to the area of the circular cross section of middle section 1214 to which it is attached. The cross section of output section 1216 remains hexagonal and its area continuously increases up to second end surface 1216B, which attaches to output surface 1218. Therefore, second end surface 1216B is also hexagonal with an area that is larger than the area of the hexagonal first end surface 1216A.

In various embodiments, the output section may have a flare angle in a range of about 5° to about 20°, by way of example. In some embodiments, output section 1216 may have a zero flare angle, that is, having no flare.

In an embodiment such as light pipe 1210, light mixing may occur in one or more of the sections and at different levels. In particular input section 1212 and middle section 1214, with their circular cross sections, may each perform some light mixing at a first level. In some embodiments, middle section 1214 may also create light interference related patterns that reduce the desired uniformity of the light exiting middle section 1214. Those patterns may include concentric rings of different intensities.

Output section 1216, on the other hand, with its flared polygonal cross section, may perform light mixing at a second level that is higher than the first level. In some embodiments, a straight section with a polygonal cross section, such as output section 1216, may reduce the undesired interference patterns generated by the previous sections such as middle section 1214, and therefore conveniently increase the uniformity of the light output of the light pipe.

In various embodiments, the output section with a straight profile may be required to have an optimum length, that is, a length within a specific range to deliver optimum results. In particular, the color mixing level of the output section and its performance for increasing the uniformity of the light output may increase as its length increases. Moreover, the optimum length may be proportional to the width (e.g., diameter) of the output section. For example, if in a first sample of light pipe 1210, a first output section is used for which the width is 3 mm and the length is 30 mm, and in a second sample, the first output section is replaced with a second output section for which the width is 5 mm, then, to achieve the same approximate level of light mixing as in the first sample, the second output section may be required to have a length of 50 mm. In some embodiments, the length of the straight profiled section is required to be larger than 5 times, and preferably larger than 10 times, the width of the input light or the width of the input section.

Increasing the length of the output section may, on the other hand, have negative effects on the cost or usage of the light pipe. For example, increasing the length of the output section may increase the overall size of the light pipe, thus rendering the light pipe less suitable for use in smaller or portable lighting systems. Similarly, increasing the length of the output section may necessitate use of more material or larger molding frames. Therefore, an optimal length for the straight part of the light pipe may be selected to balance the above-disgust advantages of increasing the length to achieve a higher level of light mixing versus the disadvantages of the above negative effects. Finding the balance may also depend on the properties of the sections with circular cross sections, such as their level of light mixing or generating interference patterns as well as the properties discussed below.

Regarding additional properties of the sections that have circular cross sections, such as input section 1212 or middle section 1214, such sections may be easier or less expensive to manufacture as compared to a section with as polygonal cross section, such as output section 1216. For example, different sections and in particular the sections with circular cross sections may be manufactured from glass. Such glass sections may provide advantages such as resistance to the heat generated by the light source. For example, in some embodiments, input section 1212 may be formed of glass to allow the use of the light pipe with a high-intensity light source (e.g., a high-intensity LED) while middle section 1214 and output section 1216 are formed of a plastic material to reduce manufacturing cost.

Therefore, various embodiments may combine the use of these two types of sections to achieve a balance between cost and light mixing performance.

Figure 12B:
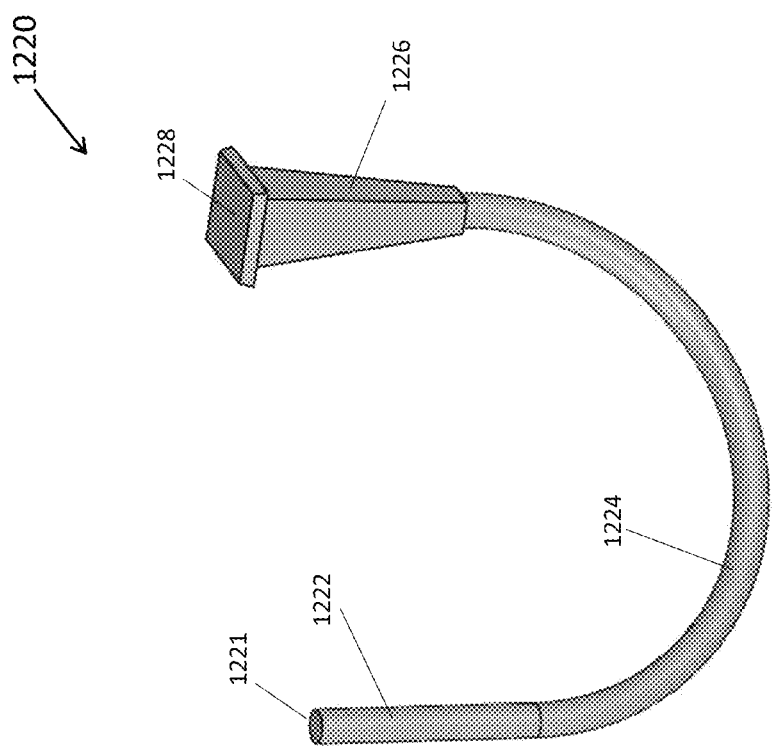
FIG. 12B shows a light pipe 1220 that combines sections with different types of cross sections according to some other embodiments.

Various embodiments may choose different types of polygons for the cross section of one or more of their light mixing sections. FIG. 12B shows a light pipe 1220 that combines sections with different types of cross sections according to some other embodiments. More specifically, light pipe 1220 includes an input surface 1221, an input section 1222, a middle section 1224, an output section 1226, and an output surface 1228. Input section 1222 has a circular cross section and a straight profile, and is similar to input section 1212. Middle section 1224 is also similar to middle section 1214, having a circular cross section and a curved profile.

On the other hand, output section 1226 has a flared polygonal cross section in a manner similar to output section 1216. Output section 1226 differs, however, from output section 1216 because output section 1226 has a square cross section not a hexagonal cross section. Light pipe 1220 provides advantages such as the balance between cost and performance described in relation to light pipe 1210. In some cases, however, the light output of light pipe 1210 may be closer to a circular output as compared to the light output of light pipe 1220, because the hexagonal cross section of output section 1216 is closer to a circle as compared to the square cross section of output section 1226. On the other hand, in some cases manufacturing light pipe 1220 may be easier as compared to light pipe 1210 because manufacturing a flared output section with a square cross section may be easier than manufacturing a flared output section with a hexagonal cross section.

In some other embodiments other shapes may be utilized for the polygonal cross section of one or more sections. For example, the polygon may be an octagon.

Figure 12C:
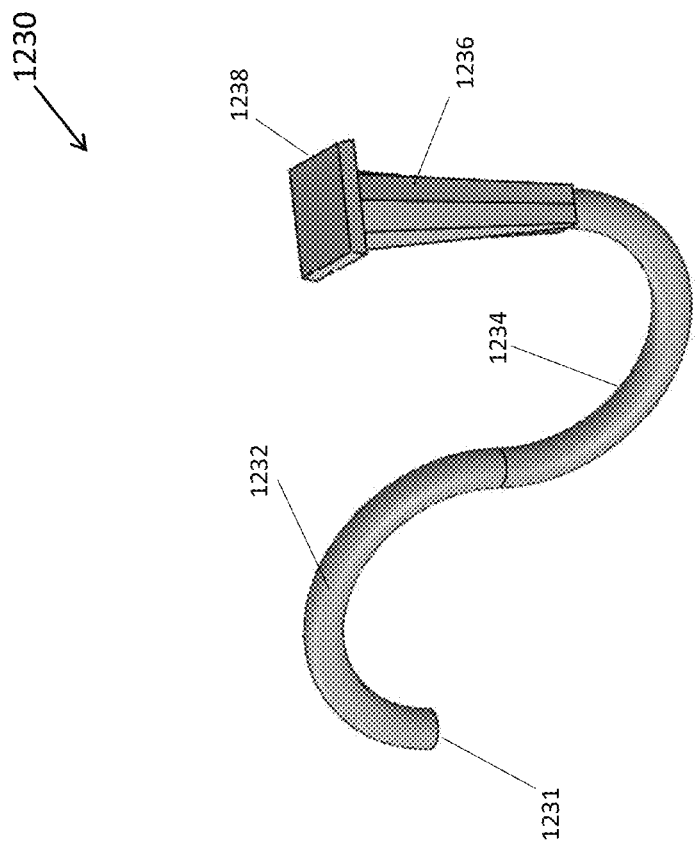
FIGS. 12C and 12D show two light pipes that utilize different types of profiles for the part that has a circular cross section according to some embodiments.
Figure 12D:
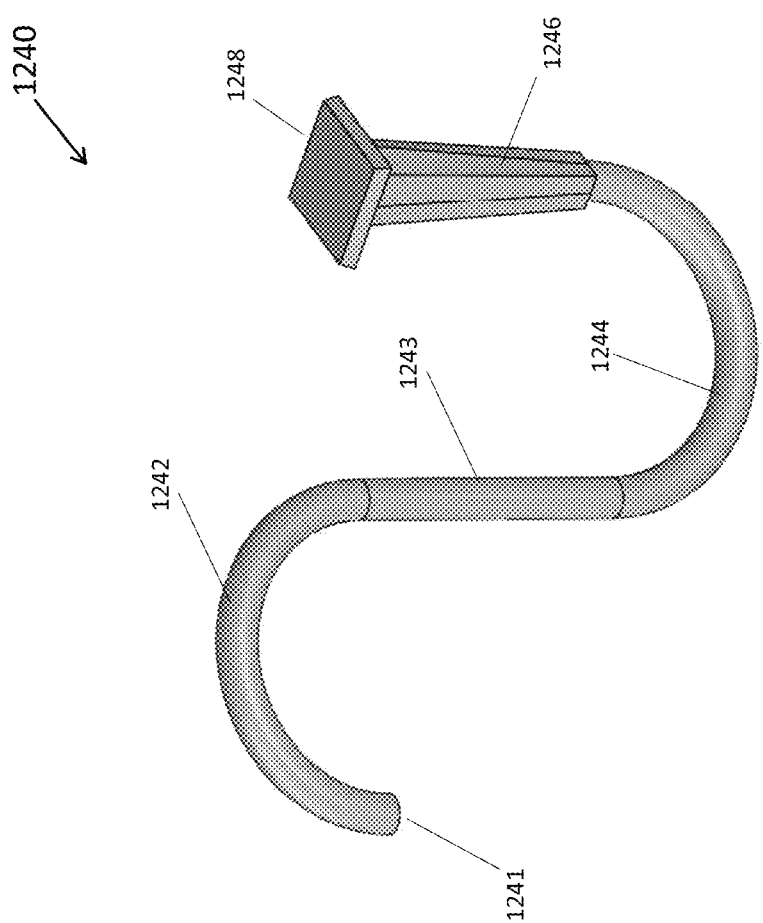

Different embodiments may utilize different types of profiles for the part that has a circular cross section. For example, while in light pipe 1210 and light pipe 1220 the middle sections are U-shaped, in other embodiments the curved sections may have other shapes. FIGS. 12C and 12D show two such embodiments.

In particular, FIG. 12C shows a light pipe 1230 that includes an input surface 1231, an input section 1232, a middle section 1234, an output section 1236, and an output surface 1238. Input section 1232 and middle section 1234 have U-shaped profiles that are attached in inverse orientations such that their combination provides a serpentine profile for the curved section of light pipe 1230. Therefore, in light pipe 1230, the light mixing segment has a profile that combines a serpentine shaped part having a circular cross section (the combination of input section 1232 and middle section 1234) with a straight part having a flared hexagonal cross section (output section 1236).

In a similar manner, FIG. 12D shows a light pipe 1240 that includes an input surface 1241 and an output surface 1248 connected by a light mixing segment in which the circular cross-sectional part has an elongated serpentine profile. More specifically, the light mixing segment in light pipe 1240 includes a first part with a circular cross section (comprising an input section 1242 having a U-shaped profile attached to a first middle section 1243 having a straight profile, itself attached to a second middle section 1244 having another U-shaped profile in an orientation that is the inverse of the orientation of input section 1242) and a second part with a flared hexagonal cross section (comprising an output section 1246 having a straight profile).

Light pipes 1230 and 1240 differ in some of their characteristics as compared to each other or to light pipes 1210 and 1220. These differences, for example in the direction of the light output or in their overall dimensions, may render them advantageous for some applications but not for some others. For example, for both light pipes 1230 and 1240, the output light exits the light pipe in the same direction as the direction in which the input light is received, which is different from light pipe 1210 and light pipe 1220, for example. This feature may be advantageous for some lighting systems. On the other hand, assuming that the radius of curvature for the curved sections are the same in all four of the light pipes (i.e., light pipes 1210, 1220, 1230, and 1240), light pipe 1240 may have a larger dimension along the vertical Direction (a tentative term for the direction of a line perpendicular to the access of the input surface) as compared to light pipes 1210, 1220, and 1230. Moreover, both light pipes 1230 and 1240 may have a larger dimension, as compared to light pipes 1210 and 1220, in the horizontal direction (a tentative term for the direction of a line that is located on the surface of the light pipe and is perpendicular to the vertical direction). In some applications, such larger dimensions may render the light pipe less usable in some smaller lighting systems.

Figure 12E:
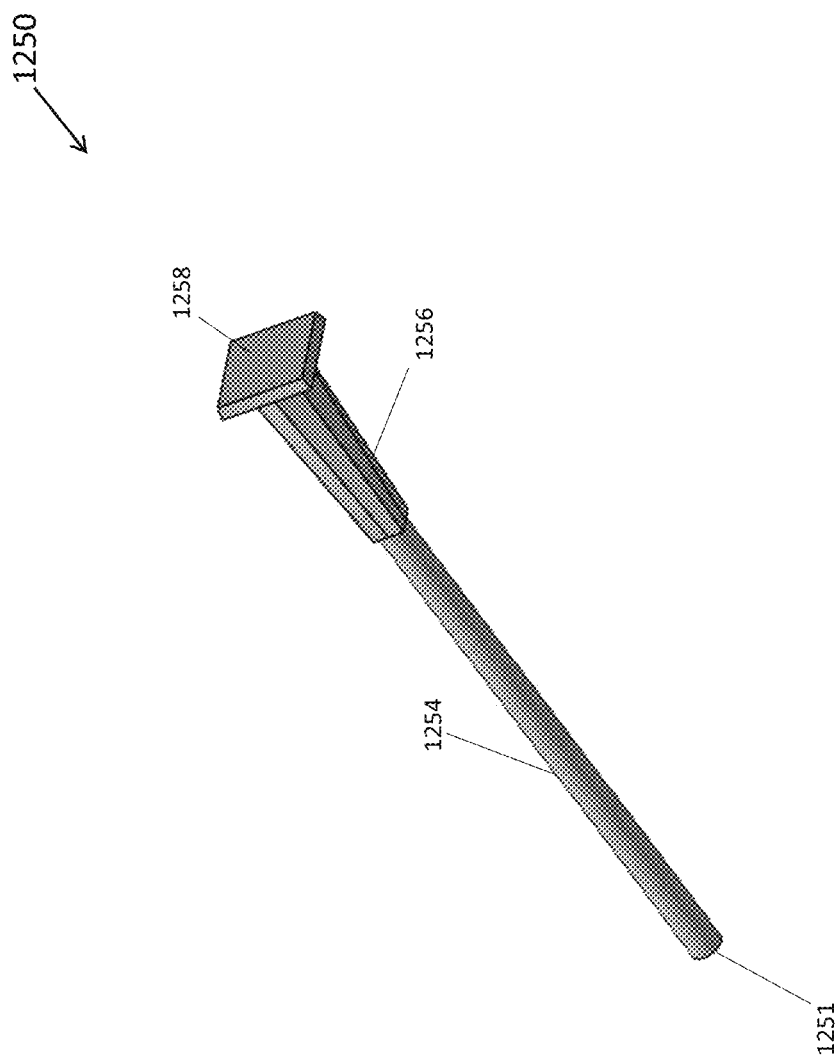
FIG. 12E shows a light pipe 1250 in which a section with circular cross section forms a straight profile according to some embodiments.

In some embodiments the sections with a circular cross section may form a straight profile. FIG. 12E shows a light pipe 1250 according to one such embodiment. Light pipe 1250 includes an input surface 1251, an input section 1254, an output section 1256, and an output surface 1258. Input section 1254 has a circular cross section and a straight profile. Output section 1256, on the other hand, has a flared hexagonal cross section and a straight profile, similar to some of the output sections described above.

In some cases, light pipe 1250 may be more usable as compared to other light pipes. For example, in cases in which the light source is located farther from the location of the output, the length of input section 1254 may be accordingly increased to enable transmitting the input light from the light source to the output surface.

Those having ordinary skill will appreciate that various changes may be made to the above embodiments without departing from the scope of the disclosure.

Although some aspects have been described in the context of a system or an apparatus, it is clear that these aspects may also represent a description of the corresponding method, where a block or device corresponds to a method step or a feature of a method step. Analogously, aspects described in the context of a method step also represent a description of a corresponding block or item or feature of a corresponding apparatus.

The foregoing description of the embodiments has been presented for purposes of illustration only. It is not exhaustive and does not limit the embodiments to the precise form disclosed. While several exemplary embodiments and features are described, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. As used herein, the singular forms "a," "an," and "the" may include the plural forms unless the context clearly dictates otherwise. Further, the term "coupled" does not exclude the presence of intermediate elements between the coupled items. Also, stating that a feature may exist indicates that the feature exists in one or more embodiments but not necessarily in all embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or.

Moreover, if these terms are used, a set may include one or more members, and a subset of a set may include one or more than one, including all, members of the set.

Further, if used in this disclosure, and unless stated or deducted otherwise, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable may be an increasing or a decreasing function of a second variable if, respectively, the first variable is directly or inversely proportional to the second variable.

The disclosed compositions, systems, methods, and apparatus are not limited to any specific aspect or feature or combinations thereof, nor do the disclosed compositions, systems, methods, and apparatus require that any one or more specific advantages be present or problems be solved. Any theories of operation are to facilitate explanation, but the disclosed compositions, systems, methods, and apparatus are not limited to such theories of operation.

Modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents. Further, the present disclosure is directed toward all novel and non-obvious features and aspects of the various disclosed embodiments, alone and in various combinations and sub-combinations with one another.

While the present disclosure has been particularly described in conjunction with specific embodiments, many alternatives, modifications, and variations will be apparent in light of the foregoing description. It is therefore contemplated that the appended claims will embrace any such alternatives, modifications, and variations as falling within the true spirit and scope of the present disclosure.

What is claimed is:

1. A light-mixing system comprising:
a light pipe comprising:
an input surface configured for receiving light from a light source;
a light-mixing segment optically coupled to the input surface; and
an output surface optically coupled to the light-mixing segment, and configured such that at least a portion of the light received at the input surface exits the light pipe through the output surface,
wherein:
the light-mixing segment includes a first section and a second section,
the second section is optically coupled to the first section,
the first section has a circular cross section, and
the second section has a polygonal cross section.

2. The light-mixing system of claim 1, wherein the second section is configured to receive light from the input surface and the first section is configured such that the output surface receives light from the first section.

3. The light-mixing system of claim 1, wherein the first section is configured to receive light from the input surface and the second section is configured such that the output surface receives light from the second section.

4. The light-mixing system of claim 3, wherein the second section has a straight profile.

5. The light-mixing system of claim 4, wherein the second section is flared.

6. The light-mixing system of claim 4, wherein the first section has a curved profile.

7. The light-mixing system of claim 6, wherein the second section is flared.

8. The light-mixing system of claim 1, wherein one of the first section and the second section has a curved profile.

9. The light-mixing system of claim 8, wherein another one of the first section and the second section has a straight profile.

10. The light-mixing system of claim 1, wherein one of the first section and the second section has a straight profile.

11. The light-mixing system of claim 1, wherein the second section is flared.

12. A light pipe, comprising:
an input section including a waveguide having a circular cross section; and
an output section having a polygonal cross section, wherein:
   the input section has an input surface for receiving light from one or more light sources and an output surface through which light exits the input section, and
   the output section has an input surface optically coupled to the output surface of the input section to receive at least a portion of the light exiting the input section, and an output surface through which light exits the light pipe.

13. The light pipe of claim 12, wherein the waveguide of the input section is curved.

14. The light pipe of claim 13, wherein the output section is straight.

15. The light pipe of claim 14, wherein the output section is flared.

16. The light pipe of claim 12, wherein the output section is straight.

17. The light pipe of claim 16, wherein the output section is flared.

\* \* \* \* \*